US007447140B2

(12) United States Patent
Lutwyche et al.

(10) Patent No.: US 7,447,140 B2
(45) Date of Patent: Nov. 4, 2008

(54) FERROELECTRIC PROBE STORAGE APPARATUS

(75) Inventors: Mark Ian Lutwyche, Mars, PA (US); Earl Chrzaszcz Johns, Sewickley, PA (US); Martin Gerard Forrester, Murrysville, PA (US); Mark David Bedillion, Oakdale, PA (US); Andreas Karl Roelofs, Pittsburgh, PA (US); Joachim Walter Ahner, Pittsburgh, PA (US); Robert Earl Rottmayer, Wexford, PA (US); Andre Y L Liem, Wexford, PA (US); Edward S. Skalko, Allison Park, PA (US); Xueshi Yang, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 776 days.

(21) Appl. No.: 10/902,910

(22) Filed: Jul. 30, 2004

(65) Prior Publication Data

US 2006/0023606 A1 Feb. 2, 2006

(51) Int. Cl.
*G11B 9/00* (2006.01)

(52) U.S. Cl. .................................................. 369/126

(58) Field of Classification Search .................. 369/126
See application file for complete search history.

(56) References Cited

U.S. PATENT DOCUMENTS 4,903,151 A 2/1990 Mizukami et al.
5,329,122 A * 7/1994 Sakai et al. ................. 250/306
5,461,605 A * 10/1995 Takimoto et al. ............ 369/126
5,512,773 A 4/1996 Wolf et al.
5,581,083 A * 12/1996 Majumdar et al. .......... 250/306
5,679,952 A 10/1997 Lutwyche et al.
5,777,977 A 7/1998 Fujiwara et al.
5,801,472 A 9/1998 Wada et al.
5,886,922 A * 3/1999 Saito et al. .................. 365/164
5,946,284 A 8/1999 Chung et al.
5,966,787 A * 10/1999 Nakayama et al. ......... 29/25.35
5,985,404 A * 11/1999 Yano et al. ............... 428/846.1
6,046,973 A 4/2000 Thomas
6,064,587 A 5/2000 Jo
6,157,510 A 12/2000 Schreck et al.
6,195,230 B1 2/2001 O'Connor
6,249,503 B1 6/2001 Aratani
6,369,400 B1 4/2002 Haeberle et al.
6,373,648 B2 4/2002 O'Connor (Continued)

OTHER PUBLICATIONS

M. E. Lines et al., "Principles and Applications of Ferroelectrics and Related Materials," Clarendon Press, Oxford, 1977, pp. 87-111.

(Continued)

*Primary Examiner*—Thang V Tran
(74) *Attorney, Agent, or Firm*—Robert P. Lenart, Esq.; Pietragallo Gordon Alfano Bosick & Raspanti, LLP

(57) ABSTRACT

An apparatus comprises a ferroelectric storage medium, and a transducer for reading data from the ferroelectric storage medium and for writing data to the ferroelectric storage medium, wherein the transducer includes a substrate and a probe coupled to the substrate, wherein the probe includes a conductive element and a bilayer structure causing the probe to bend toward the ferroelectric storage medium.

31 Claims, 18 Drawing Sheets

36 42 32 30 38 54 56 48 52 50 34 46 40 44

U.S. PATENT DOCUMENTS

| | | | | |
|---|---|---|---|---|
| 6,515,957 | B1 | 2/2003 | Newns et al. | |
| 6,647,766 | B2 | 11/2003 | Despont et al. | |
| 6,788,086 | B2 * | 9/2004 | Hantschel et al. | 324/762 |
| 7,015,584 | B2 * | 3/2006 | Chow et al. | 257/773 |

OTHER PUBLICATIONS

K. Franke et al., "Modification and Detection of Domains on Ferroelectric PZT Films by Scanning Force Microscopy," *Surface Science Letters*, vol. 302, 1994, pp. 283-288.

P. W. M. Blom et al., "Ferroelectric Schottky Diode," *Physical Review Letters*, Vo. 73, No. 15, Oct. 10, 1994, pp. 2107-2110.

U. Rabe et al., "Vibrations of Free and Surface-Coupled Atomic Forbe Microscope Cantilevers: Theory and Experiment," *Rev. Sci. Instrum.*, vol. 67, No. 9, Sep. 1996, pp. 3281-3293.

M. I. Lutwyche et al, "Millipede—A Highly-Parallel Dense Scanning-Probe-Based Data-Storage System," *Digest of Technical Papers—IEEE International Solid-State Circuits Conference*, Feb. 7-9, 2000, pp. 126-127, 450.

M. I. Lutwyche et al., "Highly Parallel Data Storage System Based on Scanning Probe Arrays," *Applied Physics Letters*, vol. 77, No. 20, Nov. 13, 2000, pp. 3299-3301.

B. Nagaraj et al., "Influence of Contact Electrodes on Leakage Characteristics in Ferroelectric Thin Films," *Journal of Applied Physics*, vol. 90, No. 1, Jul. 1, 2001, pp. 375-382.

Y. Cho et al., "Tbit/inch$^2$ Ferroelectric Data Storage Based on Scanning Nonlinear Dielectric Microscopy," *Appl. Phys. Lett*, vol. 81, No. 23, Dec. 2, 2002, pp. 4401-4403.

Y. Cho et al., "Terabit Inch$^{-2}$ Ferroelectric Data Storage Using Scanning Nonlinear Dielectric Microscopy Nanodomain Engineering System," *Institute of Physics Publishing*, vol. 14, 2003, pp. 637-642.

C. Harnagea et al., "Contact Resonances in Voltage-Modulated Force Microscopy," *Applied Physics Letters*, vol. 83, No. 2, Jul. 14, 2003, pp. 338-340.

* cited by examiner

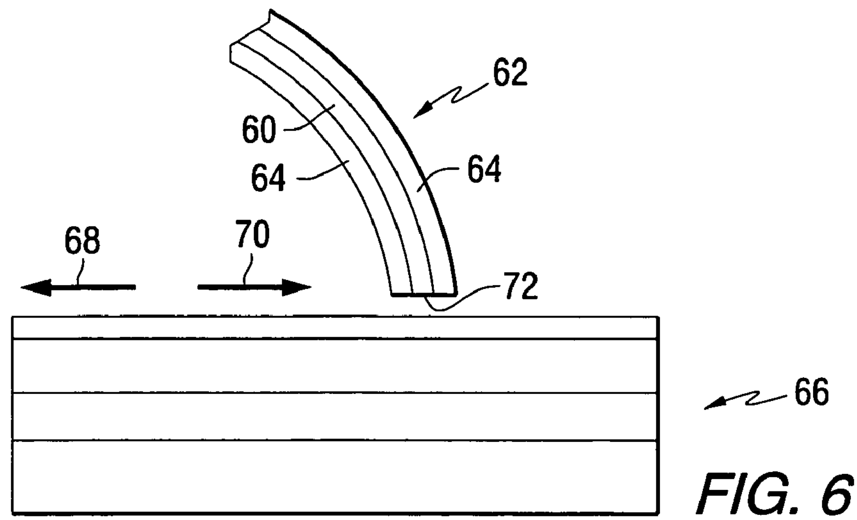
FIG. 6
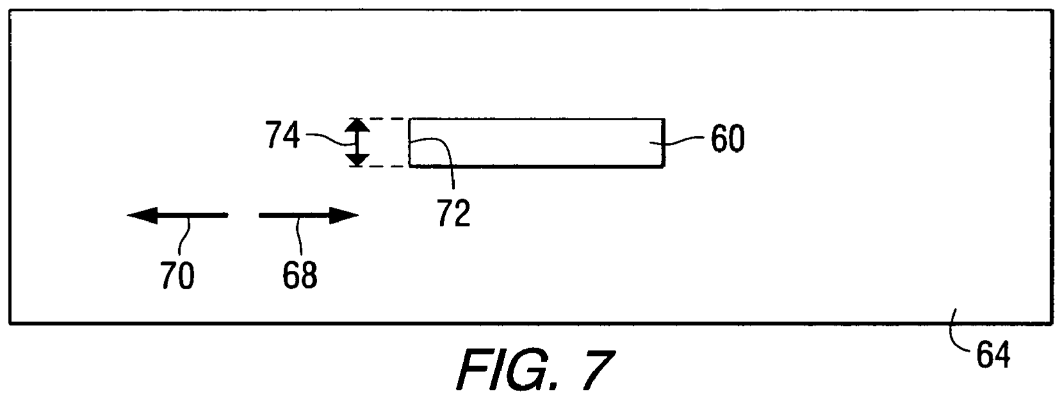
FIG. 7
FIG. 8
FIG. 9
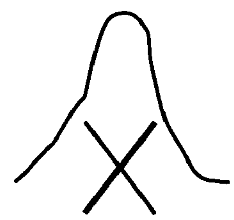
FIG. 10
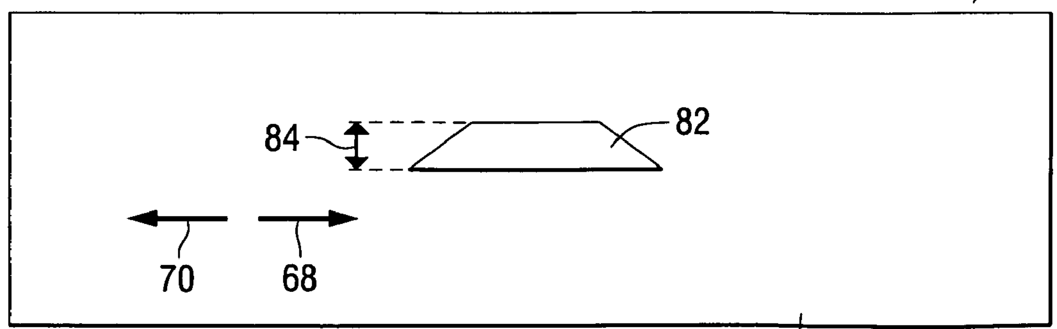
FIG. 11

FERROELECTRIC PROBE STORAGE APPARATUS

FIELD OF THE INVENTION

This invention relates to data storage devices, and more particularly to probe storage devices that include ferroelectric storage media.

BACKGROUND OF THE INVENTION

Ferroelectric materials can form the basis for data storage devices, where digital "1" and "0" levels are represented by the electric polarization of a ferroelectric film pointing "up" or "down". Storage devices based on a ferroelectric storage medium include Ferroelectric Random Access Memory (FeRAM) and scanning-probe storage systems ("FE-Probe").

In an FeRAM memory cell the essential storage element includes a thin ferroelectric film sandwiched between fixed, conductive electrodes. To write a bit to such a cell, a voltage pulse of either positive or negative polarity is applied between the electrodes in order to switch the internal polarization of the ferroelectric film to the "up" or "down" state, respectively. To read back the data from the FeRAM cell, a read voltage of a certain polarity (e.g. positive) is applied, which switches the polarization of the ferroelectric in cells storing a "0" ("down" polarization), while having no effect in cells storing a "1". A sense amplifier measures the charge flow that results when the polarization switches, so that a current pulse is observed for cells which stored a "0", but not for cells which stored a "1", thus providing a destructive readback capability.

In an FE-Probe device, one of the electrodes (referred to as a "tip") is movable relative to the media. In both cases the binary "1" and "0" are stored by causing the polarization of the ferroelectric to point "up" or "down", either in the entire cell in the case of FeRAM, or in a spatially small region (domain) local to the tip in the case of the FE-Probe. Data can then be read out destructively by applying a voltage of a magnitude and polarity such as to cause the polarization to point "up". Cells (FeRAM) or domains (FE-Probe) polarized "down" (e.g. representing "0"), will then switch to the "up" state, and a charge will flow which is proportional to the remanent polarization of the ferroelectric. Cells or domains polarized "up" will have no such current flow. The presence or absence of this current flow, as determined by a sense amplifier, can then be used to determine whether the cell or domain had contained a "1" or "0". However, for a typical domain size of 25 nm×25 nm, desirable for a FE-Probe device, the resulting charge would be limited to about 6000 electrons, giving a current of about 1 nA for a read time of 1 microsecond, which makes high-speed, low error-rate readout difficult. In addition, the readback is necessarily destructive, i.e. not preserving the original data.

Probe storage devices have been proposed to provide a small size, high capacity, low cost data storage devices. A scanning probe storage device based on ferroelectric media (FE-Probe) includes one or more heads, each including an electrode that moves relative to a ferroelectric thin film media. Binary "1's" and "0's" are stored in the media by causing the polarization of the ferroelectric film to point "up" or "down" in a spatially small region (domain) local to the electrode, by applying suitable voltages to the electrode. Data can then be read out by a variety of means, including sensing of piezoelectric surface displacement, measurement of local conductivity changes, or by sensing current flow during polarization reversal (destructive readout). Regardless of readback mechanism, the head or heads should be mechanically robust, compatible with the ferroelectric media, provide intimate electrical proximity to the media, provide a ground plane to shield for noise, and include an area of hard insulator around the read/write electrode to allow the head to "fly" on lubricant and slow wear. Finally the heads need to be manufacturable by a process compatible with the integrated silicon-based electronic circuits required for readout in a practical storage device. Standard tips manufactured for Scanning Probe Microscopy (SPM) do not meet these requirements.

This invention provides a probe storage apparatus that overcomes the deficiencies of prior devices.

SUMMARY OF THE INVENTION

This invention provides an apparatus comprising a ferroelectric storage medium, and a transducer for reading data from the ferroelectric storage medium and for writing data to the ferroelectric storage medium, wherein the transducer includes a substrate and a probe coupled to the substrate, wherein the probe includes a conductive element and a bilayer structure causing the probe to bend toward the ferroelectric storage medium.

In another aspect, the invention provides a ferroelectric storage medium comprising a layer of conductive material, a layer of ferroelectric material supported by the layer of conductive material, and permanent servo marks in the ferroelectric storage medium.

In another aspect the invention provides an apparatus comprising a ferroelectric storage medium, an array of probes for reading data from the ferroelectric storage medium and for writing data to the ferroelectric storage medium, and an actuator for moving the ferroelectric storage medium in a first direction for reading and in a second direction for writing.

The invention also encompasses an apparatus comprising a ferroelectric storage medium, an array of probes for reading data from the ferroelectric storage medium and for writing data to the ferroelectric storage medium, and an actuator for moving the ferroelectric storage medium with respect to the array of probes, the actuator including a positioning member coupled to the ferroelectric storage medium, a case containing the positioning member, a magnet and a coil wherein at least one of the magnet and coil is connected to the positioning member and the other one of the magnet and coil is fixed with respect to the case, and springs for coupling the positioning member to the case.

BRIEF DESCRIPTION OF THE DRAWINGS

FIG. 6 is a schematic illustration of a probe lever, and a storage medium.

FIG. 7 is a schematic illustration of an end of a probe lever.

FIGS. 8, 9 and 10 are schematic illustrations of domain polarization orientation.

FIG. 11 is a schematic illustration of an end of a probe lever.

DETAILED DESCRIPTION OF THE INVENTION

Figure 1:
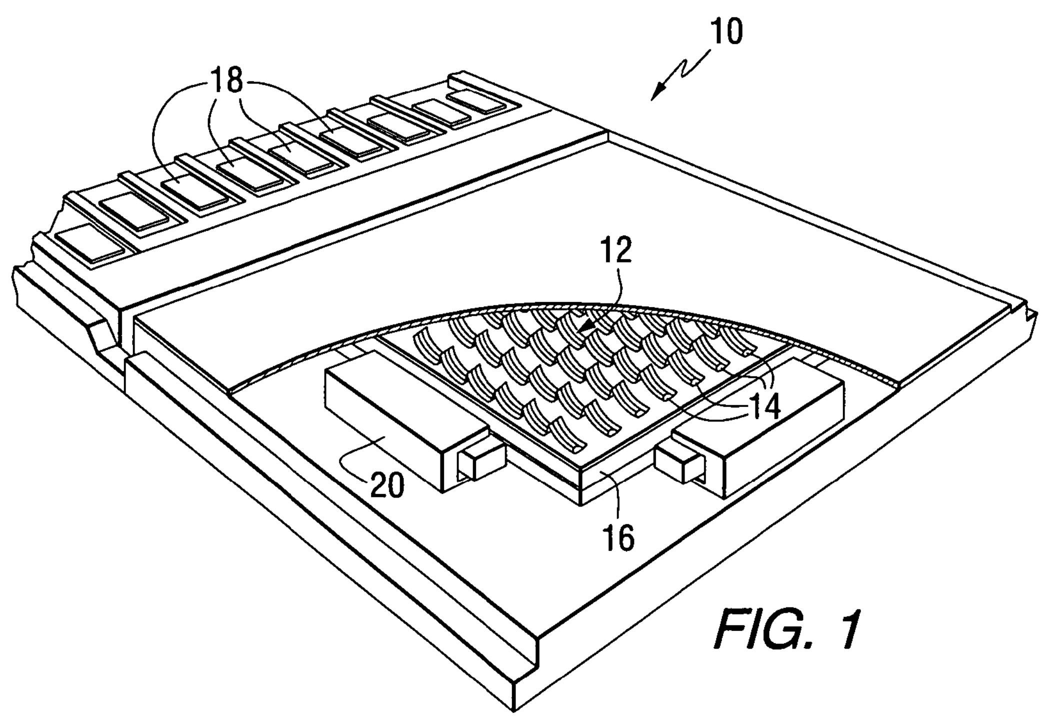
FIG. 1 is a perspective view of a ferroelectric storage array in accordance with the present invention.

This invention provides probe storage devices that include a ferroelectric storage medium. FIG. 1 is a perspective view of a ferroelectric storage device 10 which illustrates an implementation of a storage system constructed in accordance with the present invention. In the ferroelectric storage device 10 of FIG. 1, an array 12 of ferroelectric heads 14 is positioned adjacent to a storage medium 16. In the configuration shown in FIG. 1 the array 14 and the medium 16 are planar and extend generally parallel with each other. The array 14 comprises a plurality of electrodes which are operably coupled to connectors 18. The storage medium 16 is coupled to at least one actuator 20 which is configured to move the medium 16 relative to array 12. This movement causes the ferroelectric heads to be moved relative to the individual ferroelectric domains on medium 16. Each head can include one or more electrodes. To address the destructive readback of data, one technique maintains at least one sector on the storage medium 16 which is available for writing data during a read operation. This available sector is thereby used to reproduce the data which is being destructively readback. Other techniques rewrite the data to the same domain or to other locations on the media.

Figure 2:
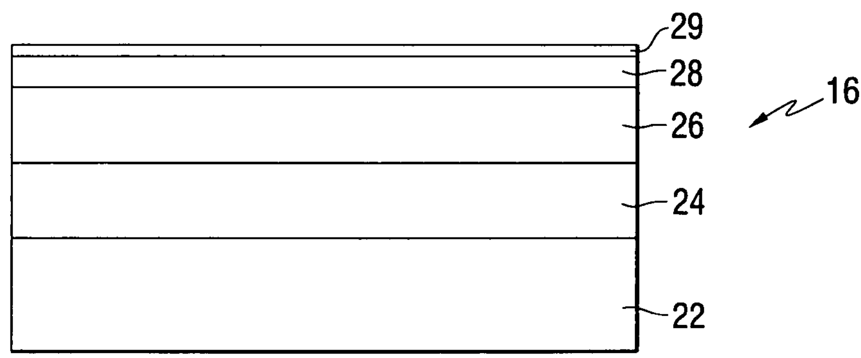
FIG. 2 is a cross-sectional view of a portion of a ferroelectric storage medium.

FIG. 2 is a side view of a ferroelectric storage medium 14. In this embodiment the storage medium includes a substrate 22, which can be for example Si, a first layer 24 which can be for example $SrTiO_3$ positioned on the substrate, a layer 26 which can be for example $SrRuO_3$ positioned on the first layer, and a ferroelectric layer 28 which can be for example lead zirconium titanate (PZT) positioned on the second layer. However, other intermediate layers may be used to align the structures between the substrate and the PZT film. In addition, the PZT layer can be doped with other materials, such as lanthanum. While specific example materials are described here, it should be understood that this invention is not limited to the example materials.

Due to electric field spreading in the ferroelectric film, a thin ferroelectric layer is needed for high bit densities. The domain wall stability may improve with thinner films, thereby providing better thermal stability. A top layer 29 can be included to minimize cantilever wear. This material can be liquid or solid lubricant with a high dielectric constant. In one example, the first layer has a thickness of about 100 nm, the second layer has a thickness in the range from about 50 nm to about 100 nm, and the PZT layer has a thickness in the range of 10 to 30 nm. The lubricant layer can have a thickness of 1-3 nm.

Figure 3:
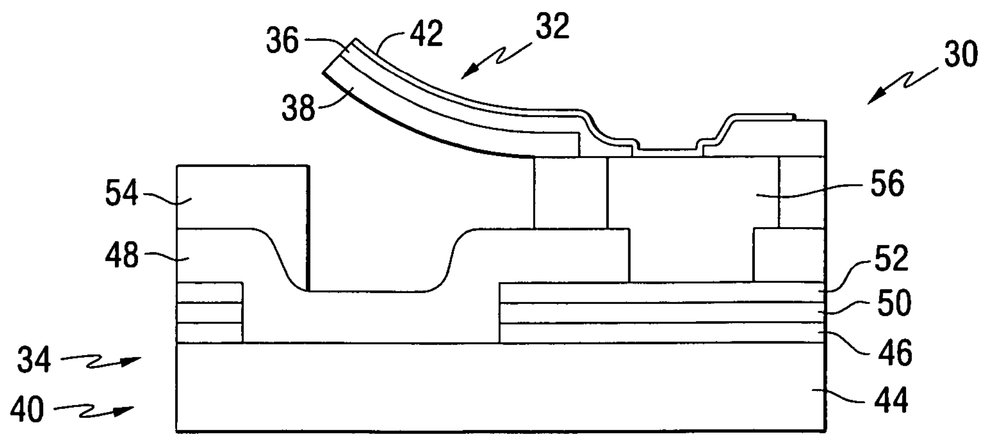
FIG. 3 is a schematic illustration of one embodiment of the probe lever, and its mechanical and electrical support structures.

This invention includes a probe head designed for scanning probe storage, and a method for fabricating the probe head. FIG. 3 is a schematic illustration of one embodiment of the probe head assembly 30 including a lever 32, and its mechanical and electrical support structures 34. The probe lever includes a pair of thin films 36 and 38 (bilayer), deposited on a substrate 40 containing other supporting films and/or electronic circuitry, and whose biaxial stress levels are chosen to ensure that the bilayer wants to bend up from the underlying substrate. This can be achieved by choosing the lower film 36 in the bilayer to have more compressive biaxial stress than the second layer 38 in the bilayer. This stressed bilayer is deposited overlapping a sacrificial layer (not shown in FIG. 3), which is removed selectively by a chemical process, so that the bilayer will bend up from the substrate when the sacrificial layer is removed. The bilayer has a suitable metal or conductive metal-oxide layer 42 (referred to as a lead) attached to it, so that the lever substrate can be brought in proximity to the ferroelectric media, and the probe metal brought in electrical contact with the media to allow data reading and writing. The probe metal is chosen to be mechanically hard (to resist wear), to be chemically compatible with the media (to avoid media or electrode degradation), and to have high electrical conductivity in both its bulk and surface. Electronic circuitry can be integrated into the substrate. All materials are deposited and processed using relatively low-temperature processes <<150° C.) that will not be detrimental to the electronic circuitry. In fact, it is a distinct advantage to have a lever process that uses lower temperatures and can be deposited on top of electronic circuitry so that a preamplifier or sense amplifier can be located at the end of the lever to minimize stray noise and improve signal quality.

In this example, the substrate includes a first layer 44 which supports a first conductor adhesion layer 46 and an insulating layer 48, of for example, alumina. A conductor 50 is positioned on the first conductor adhesion layer 46, and a second conductor adhesion layer 52 is positioned on the conductor 50. A passivation layer 54 is provided on the insulating layer. A conductor plug 56 provides an electrical connection between the conductor 50 and the probe 32 through a via in the passivation layer and the insulating layer. While one lead is shown in this example, it should be understood that multiple leads and other structures can be included in the lever.

Figure 4:
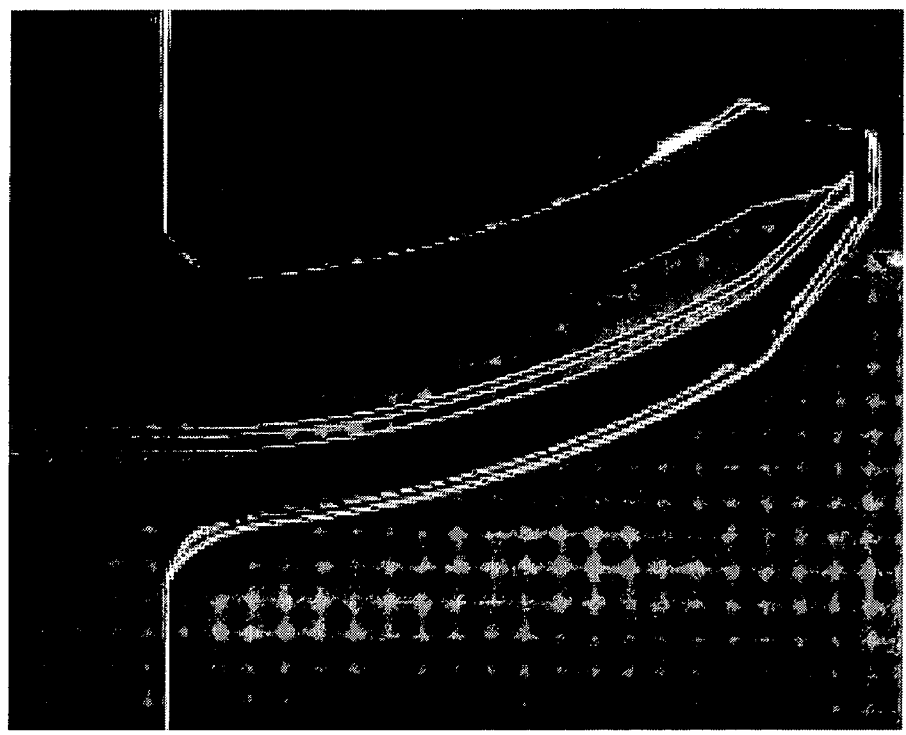
FIG. 4 is an electron micrograph of the type of lever illustrated in FIG. 3.

FIG. 4 is an electron micrograph of the type of lever illustrated in FIG. 3, with the metallic electrode (in this case tantalum) visible in the center of the lever. FIG. 4 shows an electron micrograph of such a completed lever, using tantalum (Ta) and alumina ($Al_2O_3$) as the first and second layers, respectively, of the stressed bilayer. Desirable properties of the Ta/alumina combination include: high mechanical strength, sufficient mechanical compliance, a metallic first layer that acts as an electrical shield, and well-matched thermal expansion coefficients.

The probe metal that forms the lead can be located on top of the lever and can be made of, for example, ruthenium (Ru). This has several advantages over other metallic electrode materials, including resistance to corrosion (during the fabrication process and during use) since Ru is a noble, corrosion-resistant metal, and has a high electrical conductivity (about 8 micro-ohm-cm), and an electrically conductive surface oxide. It is also chemically compatible with a lead-zirconium-titanate (PZT) ferroelectric media. However, any hard metal with a conducting oxide or thin native oxide could be used.

Steps that can be used to fabricate the lever and its electrodes are as follows, starting with a suitable substrate that may contain pre-fabricated silicon circuitry:

1. Fabricate, by microlithography, thin film deposition, and etching, the mechanical support and electrical contact structures on the substrate.

2. Deposit a film of a sacrificial material, such as copper or nickel-iron.

3. Deposit, with deposition conditions chosen to produce the desired biaxial stress levels, the two lever bilayer materials, such as Ta and $Al_2O_3$, followed by the conductive electrode, for example Ru.

4. Lithographically pattern, and etch, the conductive electrode and the bilayer materials, exposing the underlying sacrificial layer.

5. Fabricate, by microlithography, thin film deposition, and etching, any additional required electrical contact structures.

6. Remove the sacrificial layer, e.g. by wet etching in a solution that etches the sacrificial layer, but not the bilayer materials, such as sulfuric acid and hydrogen peroxide for a nickel-iron or copper sacrificial layer.

Figure 5:
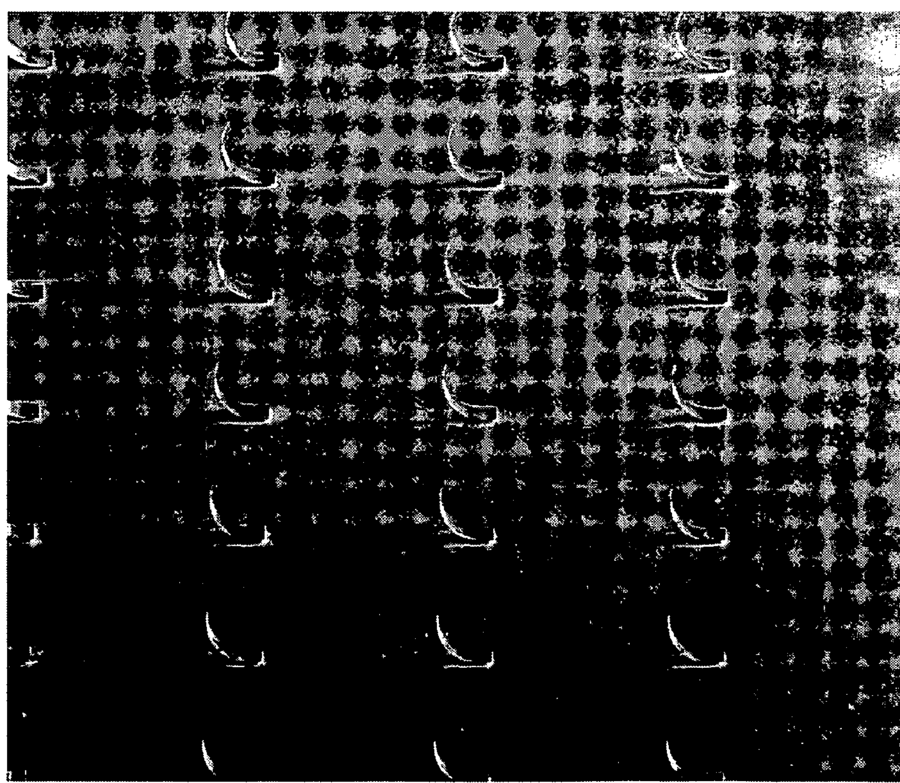
FIG. 5 is a micrograph showing an array of levers.

The lever is then free to bend away from its substrate, facilitating electrical proximity between the electrode and the ferroelectric media. FIG. 5 is a micrograph showing an array of levers.

In the probe assembly of FIG. 3, the thickness of the lead defines the track width. In operation, the read and write operations can occur at the same edge of the lead. In one example, the track width is less than 30 nm. By moving the lever in a sideways direction during reading and writing, the film thickness rather than the width of the probe metal trace will define the track width. This is illustrated in FIG. 6. In FIG. 6, the lead 60 in the lever 62 is shown to be surrounded by an insulating layer 64. The ferroelectric storage medium 66 is moved in a first direction 68 for writing and in a second direction 70 for reading. The write and read operations occur at the same edge 72 of the lead. By using the same edge of the lead for writing and reading, imperfections at the edge of the lead have a smaller effect on the performance of the system, thus improving the signal to noise ratio.

FIG. 7 is an end view of the lever of FIG. 6. The width of the domain in the storage medium is controlled by the width 74 of the lead. If the track edge of the film is not precisely perpendicular to the track orientation, then the written data will be skewed as illustrated in FIG. 8.

If the trailing edge of the lead tip does not have this same shape, then the read edge will be convolved with the write pattern to broaden the readback waveform. This results in the read waveform being broadened as shown in FIG. 9.

By using the same edge of the probe metal to do the writing and reading, the results illustrated in FIG. 10 can be achieved. This scheme applies for many different non-uniform shapes of levers. FIG. 11 is an end view of an alternative lever 80 having a lead 82 with a trapezoidal end shape. The width of the domain in the storage medium is controlled by the width 84 of the lead 82, which is surrounded by insulation 86.

The ferroelectric erase readback works as follows. The head, which is a conducting pole, is swept over the ferroelectric media. The head has a constant voltage on it sufficient to reverse the polarization of any bits that are biased opposite to the field on the head. When the polarization reverses, the charge on the media under the head will reverse. To keep the voltage on the head constant, charge must flow onto or off of the head to compensate for the change in charge on the media surface. This charge flow is what is measured. So long as the time constant for any compensating charge is slower than the repolarization, these compensating charges will not affect the reading.

There is a need to supply the voltage across the media to do the repolarization for readback, and the voltage for the writing, without adding extra capacitance to the probe. Extra capacitance on the probe could destroy the signal.

Figure 12:
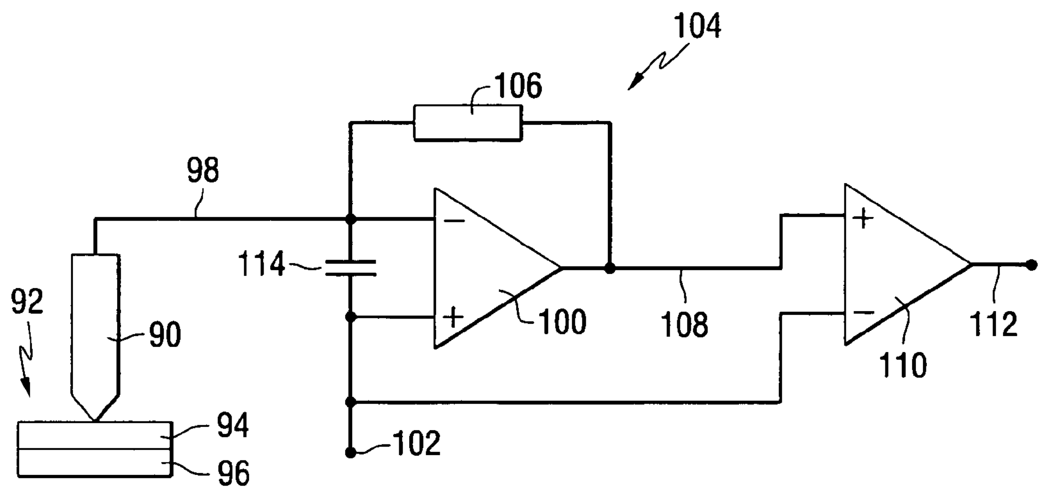
FIG. 12 is a schematic diagram of a read/write preamplifier circuit.

FIG. 12 is a schematic diagram of a circuit that performs this function. In FIG. 12, a probe 90 is positioned adjacent to a ferroelectric storage medium 92 having a ferroelectric layer 94 and ground electrode 96. An electrical connection 98 is provided between the probe and a trans-impedance amplifier 100. A connection point 102 is provided so that the (+) input of the amplifier 100 can be supplied with the write signal for writing, or the read bias for reading. Another connection, not shown, would be provided to the medium ground electrode to complete the circuit. A feedback circuit 104, including a resistor 106 is connected between the output 108 of the amplifier and the (−) input of the amplifier. A brief analysis shows that this bias will appear on the (−) input of the amp allowing reading and writing. This bias will also appear on the output of the amplifier. However this can easily be removed using a subtracting circuit, including an amplifier 110 to remove the write/bias voltage from the output 112.

This circuit allows effective writing and erase reading of the media while keeping the wiring and capacitance 114 of the front end low. In addition, the feedback resistor R also acts as a current limiter to protect parts of the media, which are leaky from destruction.

The amplifier 100 can be an OPA657 operational amplifier amp, which has a low input capacitance. In FIG. 12 the differential input capacitance, C, is labeled as item 114. The value of the feedback resistor R can be set to be as high as possible so that the RC time constant of the differential input capacitance does not interfere with the bandwidth, b (this assumes that the Johnson noise is not a significant factor.)

So $R<\alpha/2\pi f$, where $\alpha$ is a factor which has to be varied, but is close to 1. A third source of noise is Johnson noise $N_R=(4kTfR)^{1/2}$.

Then a sum of the noise is:

$$N_T=(N_V^2+N_I^2+N_R^2)^{1/2}.$$

Figure 13:
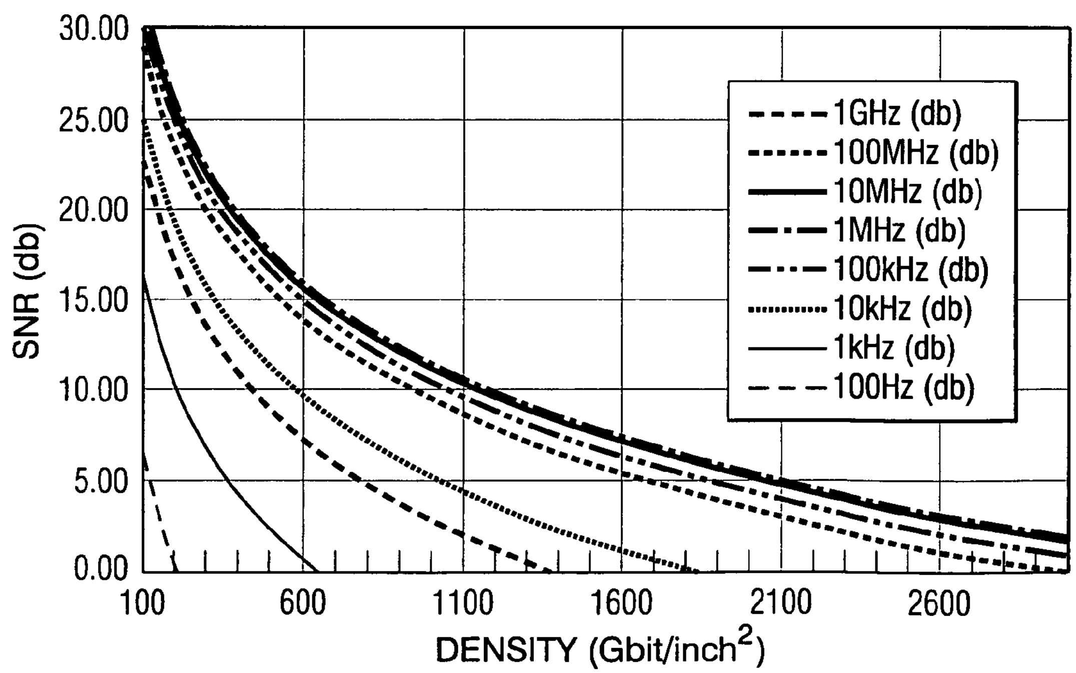
FIGS. 13 and 14 are graphs of signal-to-noise ratio versus density.

Shot noise is accounted for by the input current noise ($N_I$), which is a function of the input bias current (2 pA). If the input current is greater than that, then the shot noise will not be a problem. The input current is assumed to be the same as the change in polarization charge that is needed when the bit flips. The signal is calculated by taking the polarization area charge, multiplying by the area of the bit, and dividing by the bit reading speed. This gives the signal as a current. The polarization was taken as 80 $\mu C/cm^2$. FIG. 13 shows the calculated SNR for erase readback.

For a 1 MHz bandwidth the noise should be 275 pA RMS. A real amplifier has a current level of about 1 nA, but most of this current is due to oscillation and interference, not noise. Currently we can see 6000 electrons at 1 MHz, in theory we should reach about 1000 to about 2000 with this amp. With a lower capacitance, better results will be obtained.

Figure 14:
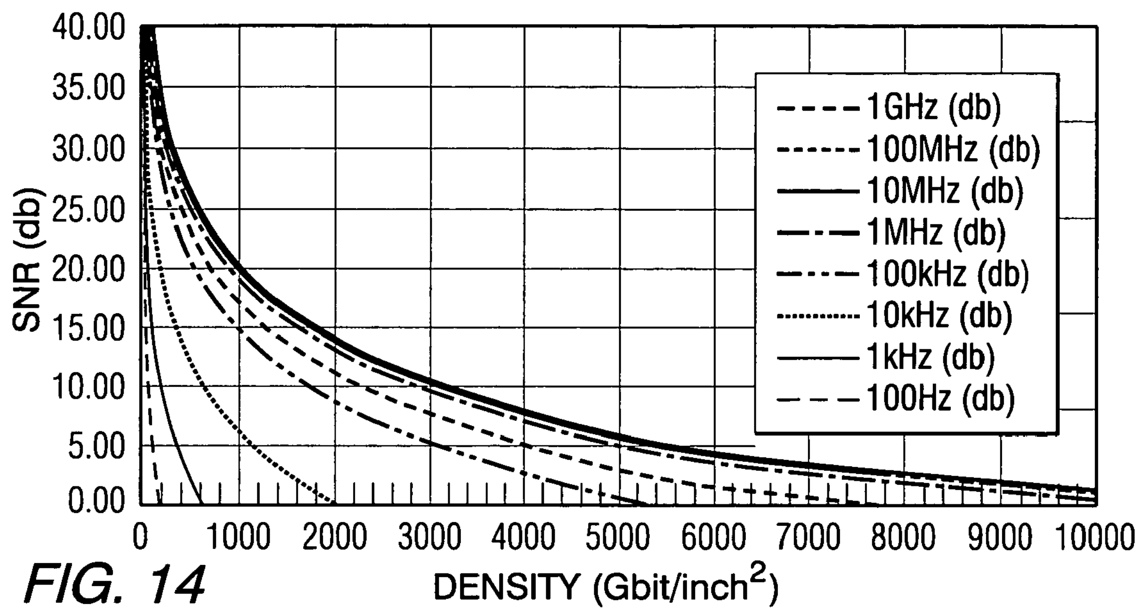

At bandwidths of 10 MHz, an SNR of 10 dB is possible at data densities of 1 Thit/inch$^2$. It is also possible that by integrating an input FET near to the lever and dispensing with the opamp package, the input capacitance could be lowered. If it could be reduced, the density and the optimum bandwidth would rise. FIG. 14 shows the calculated SNR for erase readback with reduced capacitance. A capacitance of 0.01 pF can be obtained with an integrated FET.

As the data rate rises, so does the current in proportion. The bandwidth of the amplifier also rises in proportion, but the noise is only related to the root bandwidth, so SNR goes up.

Rotational storage (disk drives) have, as one of their advantages, relatively fast access time and high data rates, especially compared to an X-Y scanning probe tip storage system. One way to improve the access time and data throughput for X-Y actuated probe storage systems is to have an array of probe tips that scan over a media surface for reading and writing to the media. The area of the media surface is the same size as the array. The array serves two purposes. The first is to increase data rate. If “n” number of levers are used simultaneously the data rate will be increased by n. The second purpose is to enhance seek time. By selecting the set of levers to be used, rather than moving the array, the part of the media that is accessed can be changed.

Selecting a subset of the array to read or write has already been achieved and is known as multiplexing the array. In the known case the multiplexing is done using a series of column and row address wires. The only row that reads and writes is that which has its row line connected. All other rows have no power applied due to diodes placed in the circuit of each lever. In semiconductor memory circuits, a transistor in each cell is used instead of a diode to switch between rows of memory cells. The row select line is attached to the gate of the transistors to switch them on. In a multiplexing system a switch of some kind is always necessary to make multiplexing work.

One of the issues with probe storage is that the constant intimate contact of the large numbers of probe tips causes wear on both the probe tips and the storage media. The apparatus of this invention can include means for selecting which levers are to be used for reading and writing in a way that prevents wear of levers not in use. In one example, the levers can be multiplexed. If the array is not multiplexed then the channel electronics must be duplicated for as many probes as the array has. Also each probe and channel would need separate wiring and increased power.

Figure 15:
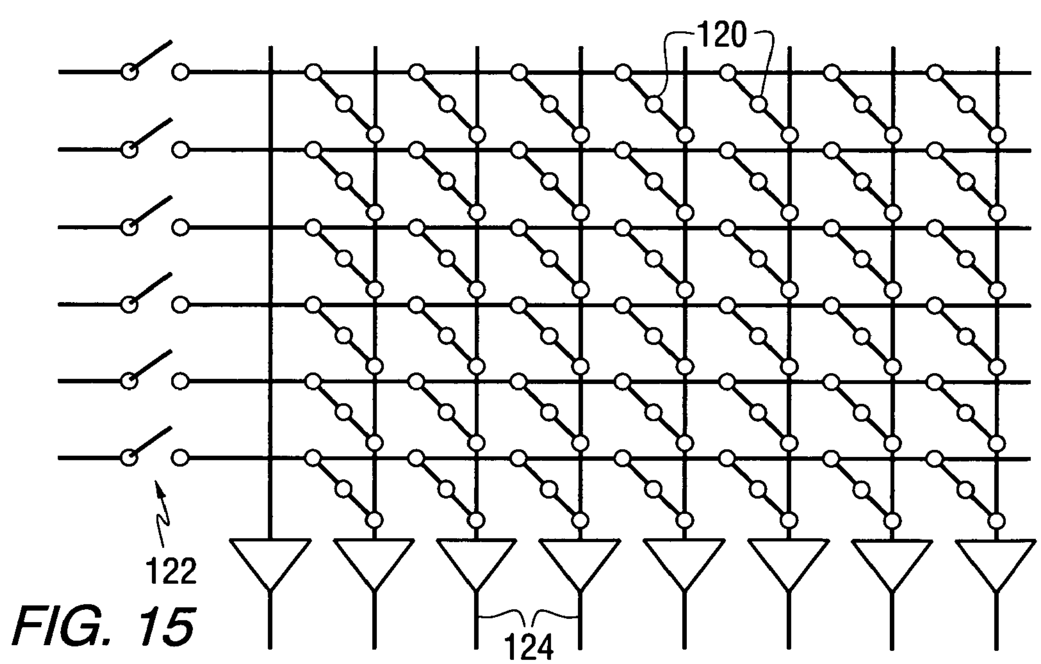
FIG. 15 is a schematic of a multiplexed probe storage system.

It would be desirable to multiplex probe tips to reduce probe tip wear, and to use an integrated manufacturing process that is compatible with MEMS or low cost thin film head manufacturing. All rows of tips need not be in contact with the surface at all times. The X-Y probe tips can be multiplexed in such a way that only one row of tips is in contact with the media at a time. FIG. 15 is a schematic of a multiplexed probe storage system. A plurality of probe head and switch assemblies 120 are arranged in an array of rows and columns. Row switches 122 are provided to make connections to individual rows of the array. Outputs can be read on a plurality of output channels 124.

Figure 16:
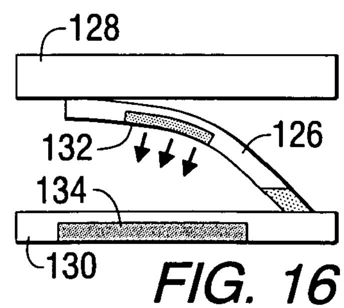
FIGS. 16, 17 and 18 are schematic illustrations of a probe lever and a storage medium.

The probe head and switch assemblies can be made in several ways. One technique is illustrated in FIG. 16. A cantilever probe, or lever, 126 extends from a probe substrate 128 toward a ferroelectric storage medium 130. A first electrode 132 is positioned on the lever 126, and a second electrode 134 is positioned under the medium 130.

Figure 17:
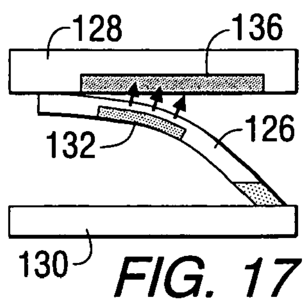

A second technique is illustrated in FIG. 17. A cantilever probe, or lever, 126 extends from a probe substrate 128 toward a ferroelectric storage medium 130. A first electrode 132 is positioned on the lever 126, and a second electrode 136 is positioned on the probe substrate to pull the lever up.

Figure 18:
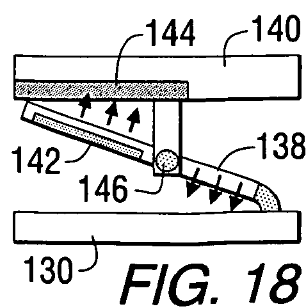

A third technique is illustrated in FIG. 18. This arrangement uses a lever, 138 coupled to a substrate 140. A first electrode 142 is positioned on the lever 138, and a second electrode 144 is positioned on the substrate. Forces between the electrodes cause the lever to rotate about a pivot 144 to push the lever down toward the medium 130.

Since the readback signal in a ferroelectric probe storage system is determined by the charge flow associated with the change of the polarization state, the signal is of a small magnitude, which thus limits readback bandwidth and increases error rates. The signal is provided by a finite reservoir of charge, determined by the remanent polarization of the ferroelectric medium. For example, for a bit size of 25 nanometers by 25 nanometers, and a remanent polarization of 50 micro-Coulombs per square centimeter, the signal would correspond to about 2000 electrons, or a current of about 0.3 nano-Amps for a readback time of one microsecond. The polarization changes from−50 to+50 micro-Coulombs per square centimeter, which corresponds to 4000 electrons or 0.6 nA. It is desirable to obtain a readback mechanism which is not limited by this finite charge reservoir, in order to increase data rates, and reduce error rates.

The apparatus of this invention can include a readback mechanism that is not limited by the finite charge associated with the remanent polarization of the ferroelectric, but rather is based on the polarization dependence of the conductivity of the ferroelectric itself, or of its interface(s) to one or both of its electrodes. The readback voltage for a FE storage device based on polarization-dependent conductivity would then be determined by the product of the bias current to the device, and the resistivity change (i.e. the inverse of the conductivity change):

$$V = I \cdot \Delta R = \frac{-I \cdot \Delta G}{G^2} \tag{1}$$

where V is the readback voltage, I is the bias current to the storage device, ΔR is the difference in resistance between the opposite polarization states of the ferroelectric medium, and ΔG is the equivalent conductance change. Since ΔR can be quite large, the resulting signals will be significantly larger than those obtained from the surface charge associated with the polarization itself, thus improving readback sensitivity, bandwidth, and error rate. Since the measurement voltage can be smaller than the voltage required to switch the ferroelectric polarization, the readback may be non-destructive, i.e. preserving the data through readback.

This invention provides a readback mechanism that is not limited by the finite charge associated with the remanent polarization of the ferroelectric, but rather is based on the polarization dependence of the conductivity of the ferroelectric itself, or of its interface(s) to one or both of its electrodes. This polarization-dependent conductivity may be based on any mechanism related to the intrinsic properties of the ferroelectric, or to the properties of its interfaces with either or both of its electrodes.

While there are several mechanisms by which the resistance of a ferroelectric and its electrode interfaces may be sensitive to the polarization state of the ferroelectric, one such mechanism can be demonstrated in a FE-Probe device. The electrical characteristics of the interface between a ferroelectric material and certain metallic or semi-metallic electrodes are consistent with the formation of a Schottky barrier at the interface. Such a barrier provides a rectifying contact between the two materials, due to the depletion of the majority carrier in the interface region, so that current flow is large in response to a voltage of one polarity ("forward bias"), but small for the other polarity ("reverse bias"). It has also been observed that the width of this depletion region, and thus the resistance to current flow, or current flow at a fixed voltage bias, is dependent on the direction of the polarization in the ferroelectric, since the polarization field may either reinforce or reduce the internal electric field associated with the charge distribution of the depletion region, depending of the polarization field direction.

Figure 19:
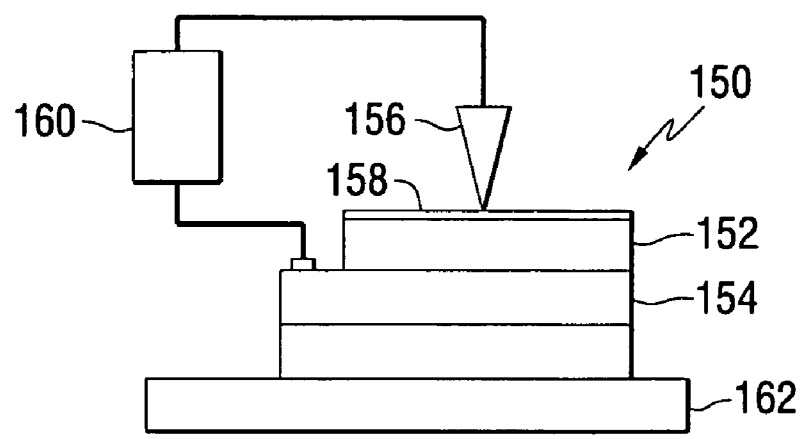
FIG. 19 is a schematic representation of a probe storage device.

One example of a FE-Probe storage device 150 based on this effect, is illustrated in FIG. 19. The device includes a thin film of a ferroelectric material 152 and a fixed base electrode 154 of a conductive material on one side of the ferroelectric. A tip electrode 156 that moves relative to the ferroelectric medium is positioned on the other side of the ferroelectric layer and made of a material which is chemically compatible with the ferroelectric material, and which forms a Schottky type contact 158 with the ferroelectric material, such as Ru. Electronic circuitry 160 is used to provide a bias between the moving and the fixed base electrode, and to measure the voltage drop or current flow between them. A translation stage 162 is provided to move the media relative to the tip.

Figure 20:
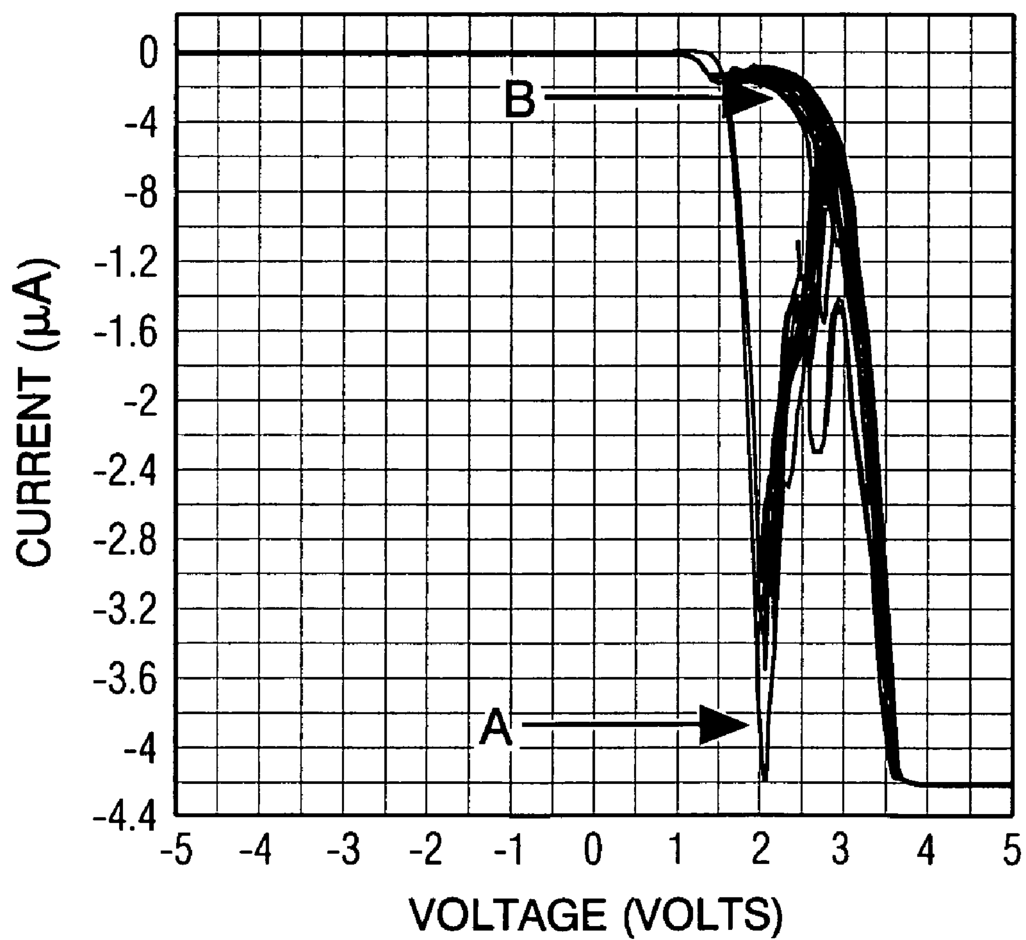
FIGS. 20 and 21 are graphs illustrating characteristics of the device of FIG. 19.

One example of the device of FIG. 19 includes a stainless steel tip, a 20 nm thick $Pb(Zr_{0.2}Ti_{0.8})O_3$ ferroelectric thin film, and a $SrRuO_3$ fixed base electrode. FIG. 20 shows a current-voltage characteristic for the device. For a positive voltage in the range of 1.5 to 3 Volts, the measured leakage current, or conductance, is very sensitive to the polarization state of the film, so that by operating at a bias voltage in that range, the magnitude of the measured current can be used to determine the polarization state of the film. To obtain the data of FIG. 20, the voltage was swept in a triangle wave from −5 V to +5 V repeatedly. The leakage current is extremely sensitive to the polarization state of the film over a voltage range of about 1.5 to 3 V, allowing a sensitive determination of the polarization state based on measurement of the leakage current. In FIG. 20, "A" corresponds to the high leakage observed before the polarization switches at around 2 V, and "B" corresponds to the lower leakage observed after the switch.

Figure 21:
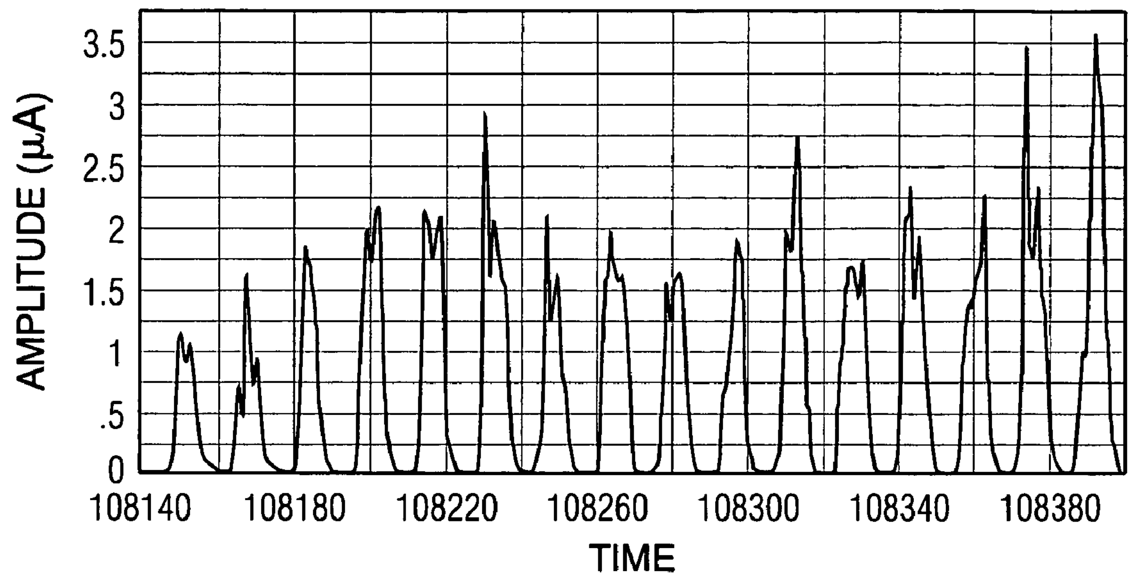

FIG. 21 shows a readback signal based on this principle, and shows a readback current of the order of one microamp, in contrast to the nanoamp signals observed in the conventional readback mode where the signal is limited by the finite charge associated with the polarization. FIG. 21 shows the readback signal, in Amps, from the scanning probe storage device, corresponding to one scan line through a "101010 . . . " bit pattern. The signal magnitude is of order one microamp, three orders of magnitude larger than that observed when measuring the charge associated with the polarization. The data of FIGS. 20 and 21 shows a signal on the order of 1000 times larger than that obtained from sensing of the polarization charge.

Piezoelectric-response force microscopy (PFM) is a standard method for investigating the domain structure of ferroelectric film. For PFM, slow scan rates and sophisticated lock-in amplifiers are required to obtain a sufficient readback signal. Nevertheless, the resolution of the PFM in the standard mode is not capable of detecting the smallest ferroelectric domains that are present in polycrystalline thin films. Furthermore, the required voltage to detect the polarization state in ultra thin ferroelectric films is close to the switching voltage of these films and the PFM measurement would probably influence the domain structure.

When using ferroelectric thin film media for probe based high-density data storage, a possible non-destructive readback method is the measurement of the piezoelectric-response signal of the thin ferroelectric film. For a ferroelectric based high-density data storage device, where low costs and high data rates are required, the current PFM setup and the cantilever design does not provide enough readback sensitivity.

This invention can include a PFM setup where the PFM signal is not limited by the actual piezoelectric response of the ferroelectric (or piezoelectric) thin film, but rather driving the cantilever at its resonance frequency (first or higher order modes) to employ the resonance magnification to amplify the PFM signal. Tailoring a new cantilever for the PFM mode and driving them at higher order resonance frequencies could enlarge the signal significantly, such that this method could be employed as a non-destructive readout for a scanning probe based storage device using ferroelectric thin films.

Figure 22:
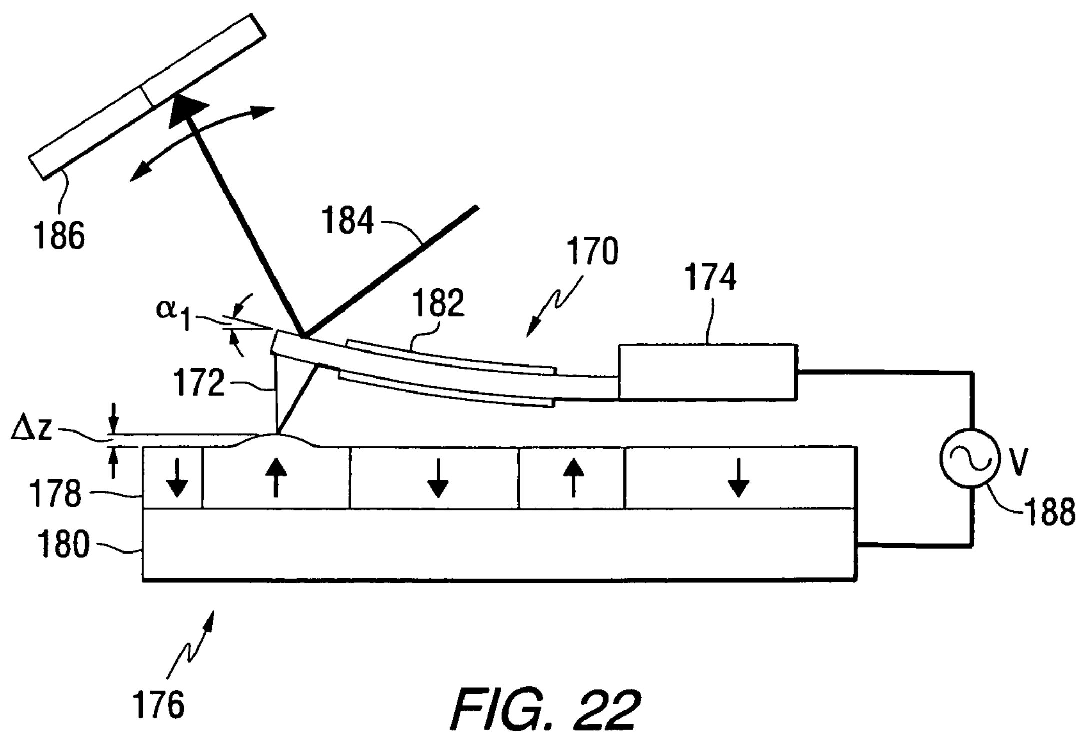
FIGS. 22, 23*a*, 23*b* and 23*c* are schematic illustrations of a probe lever and a storage medium.

FIG. 22 shows the principle of current detection methods for piezoelectric response of ferroelectric storage media. In FIG. 22, a cantilever probe 170 having a tip 172 is mounted to a substrate 174 and positioned adjacent to a ferroelectric storage medium 176. The ferroelectric storage medium has a layer of ferroelectric material 178 on a bottom electrode 180. Different techniques can be used to sense movement of the probe. A piezoelectric element 182 can be coupled to the probe and used to produce a signal representative of movement of the probe. Alternatively, a laser beam 184 can be directed onto the probe and reflected to a photodetector 186 to detect movement of the probe. A voltage source 188 is connected between the probe and the bottom electrode. The actual piezoelectric-response to an alternating electric field under the tip generates a mechanical oscillation of the tip with a maximum displacement of a few tenths of a nanometer.

This displacement is detected either by the deflection of a laser beam or by the resistance change of a piezo-resistive layer attached to the cantilever surface. The normal operation frequency of the applied electric field is below the resonance frequency of the cantilever. The amplitude of the cantilever deflection (and with it the deflection angle $\alpha_1$) is determined by the magnitude of the film thickness variation ($\Delta z$) due to the piezoelectric response: $\Delta z = d_{33} * V$, where V is the appllied AC voltage and $d_{33}$ the piezoelectric coefficient of the film.

Figure 23A:
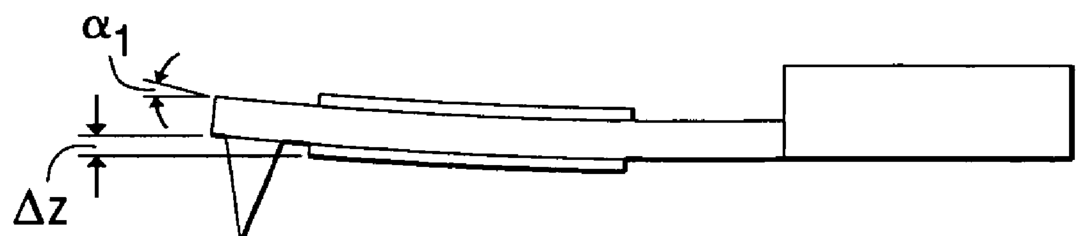
Figure 23B:
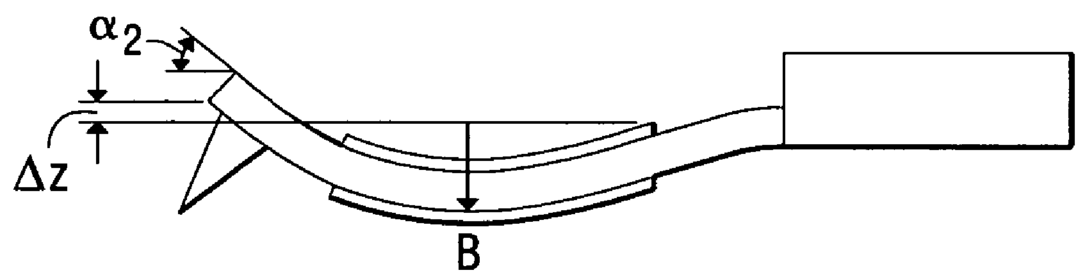
Figure 24:
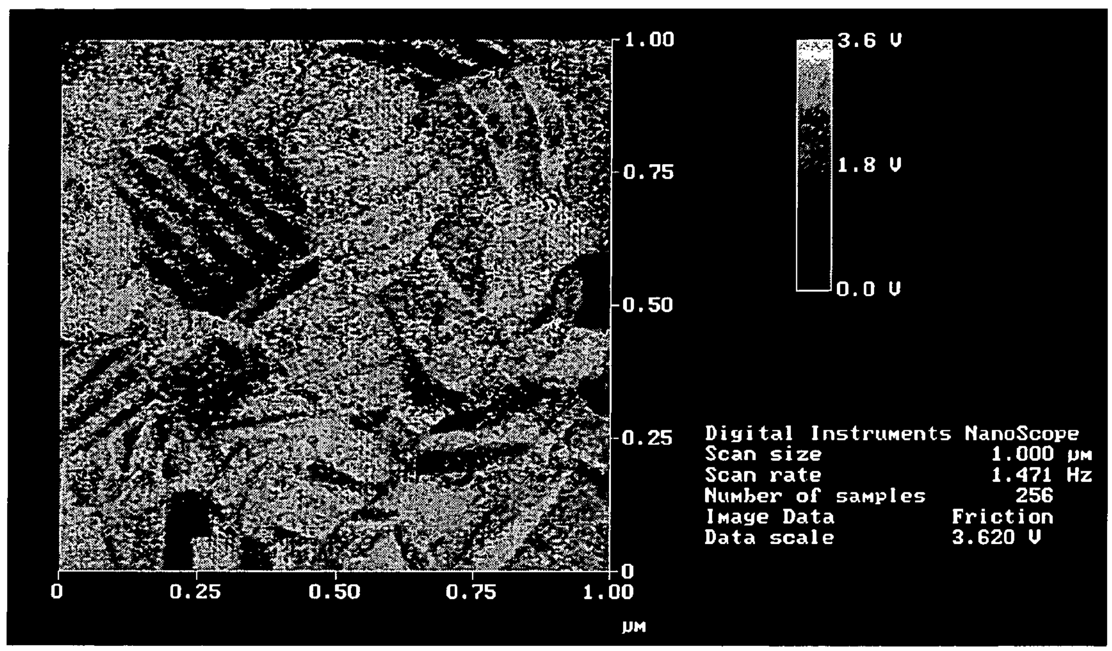
FIGS. 24, 25 and 26 are micrographs.
Figure 25:
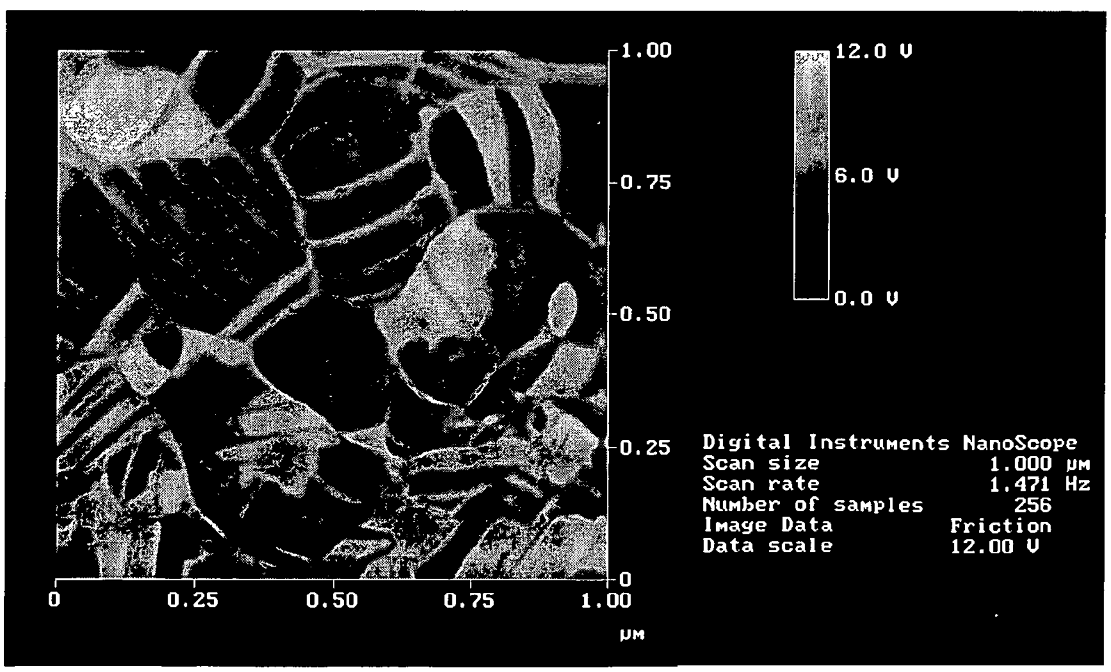

This invention can include a PFM setup, where the frequency of the applied AC voltage is at the first order or higher order resonance frequency of the pinned cantilever flexure mode. The strong van der Waals forces and electrostatic forces hold the tip in contact to the sample surface and the cantilever acts like a beam that is on one side clamped to the bulk silicon and on the other side the tip is pinned to the sample surface. This creates a standing wave within the cantilever and the readout signal is amplified by the resonance magnification and is not limited by the thickness variation $\Delta z$ determined by the piezoelectric response. Due to the resonance magnification of the cantilever oscillating at the resonance frequency the deflection angle $\alpha_2$ (FIG. 23*b*) is higher than the deflection angle $\alpha_1$ (FIG. 23*a*). Hence, the PFM signal measured on the photodiode is increased in the case of driving the cantilever at its first order oscillations leading to a higher PFM signal and better PFM resolution as shown in FIG. 24. Opposite polarization directions of the ferroelectric domains result in standing waves with 180 degree phase shift (FIG. 25). Note that this measurement was taken with an applied voltage of only 150 mV, in the standard PFM mode the required voltage is between 1 V to 2 V.

Figure 23C:
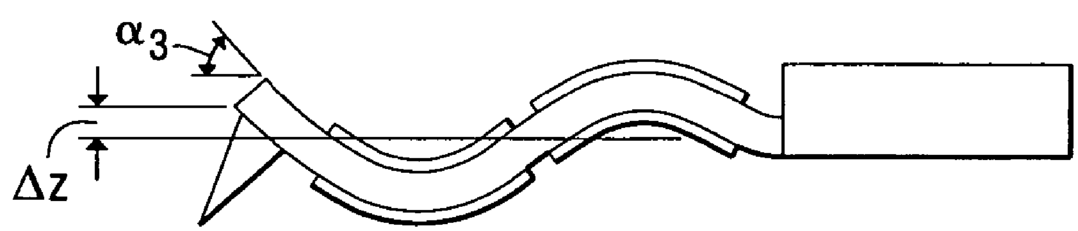

With increasing multiples of the resonance frequencies, more energy is stored in the cantilever oscillation. In the case of using piezo-resistive readback, the signal is enhanced by placing two sets of piezo-resistive sensors on opposite sides of the cantilever, segmented in regions of the maxima/minima of cantilever oscillation. The induce strain in each sensor is multiplied with the multiple of the resonance frequencies and therefore the detection sensitivity is multiplied (FIGS. 23*a*, 23*b* and 23*c*). The total number of piezo-elements is determined by the order of the cantilever resonance.

FIG. 22 shows the principle of piezo-response detection of ferroelectric orientation. Depending on the polarity of the applied potential between bottom electrode and tip and the actual polarization direction of the ferroelectric domain, the cantilever bends in the down or in the upwards direction: $\Delta z = d_{33} * V$. Here the case of a negative biased tip on top of a polarization pointing upwards is shown. If the negative biased tip is placed on top of an area with polarization pointing down, the cantilever would bend down. This motion is detected either by the deflection angle of a laser, or the stress induced change of the resistivity of a piezo-resistive coating of the cantilever. Due to the small signals, a lock-in technique can be used by applying an alternating voltage V.

FIG. 23*a* shows a cantilever oscillating below the first resonance frequency. FIG. 23*b* shows that applying an oscillating potential with a frequency value at the first harmonic oscillation of the pinned cantilever resonance frequency, a standing wave is produced within the cantilever, leading to an amplification of the readout signal as the cantilever bending ($B+\Delta z$) is higher due to the resonance magnification. FIG. 23*c* shows a cantilever oscillating at the second order resonance. The cantilever bending is detected by reflection of a laser beam at the end of the cantilever or, in case of stress induced detection, the bending is measured as the resistance change of a piezo-resistive layer depending on the phase shift of the oscillation (which depends on the ferroelectric orientation). The different piezo-resistive sections are extended or compressed, leading to a resistivity increase or decrease. The change in resistivity can be sensed by common differential electronics. Due to the higher curvature in the cases illustrated in FIGS. 23*b* and 23*c*, the signal increases from FIGS. 23*a* to 23*b* to 23*c*.

Reflecting a laser at the end of the cantilever is a second method to detect the cantilever bending. In the laser reflection method, the angle $\alpha$ is the detected parameter. Similar to the piezo-resistive readout, the angle increases with the increased order of the resonance modes, which again leads to a strong increase in the piezoelectric response.

FIG. 24 shows a PFM measurement of a $PbTiO_3$ ferroelectric thin. The excitation signal was 0.7 V, 10 kHz. The cantilever resonance frequency is about 20 kHz. FIG. 25 shows a PFM measurement of the same area with the identical cantilever applying an excitation signal of 0.7 V, 60 kHz. This is around the first order resonance frequency of the cantilever. It is clearly seen that the resolution is significantly higher at the resonance frequency and that the magnitude of the signal (compare scale bars in both cases) is increased by a factor of about 4.

Figure 26:
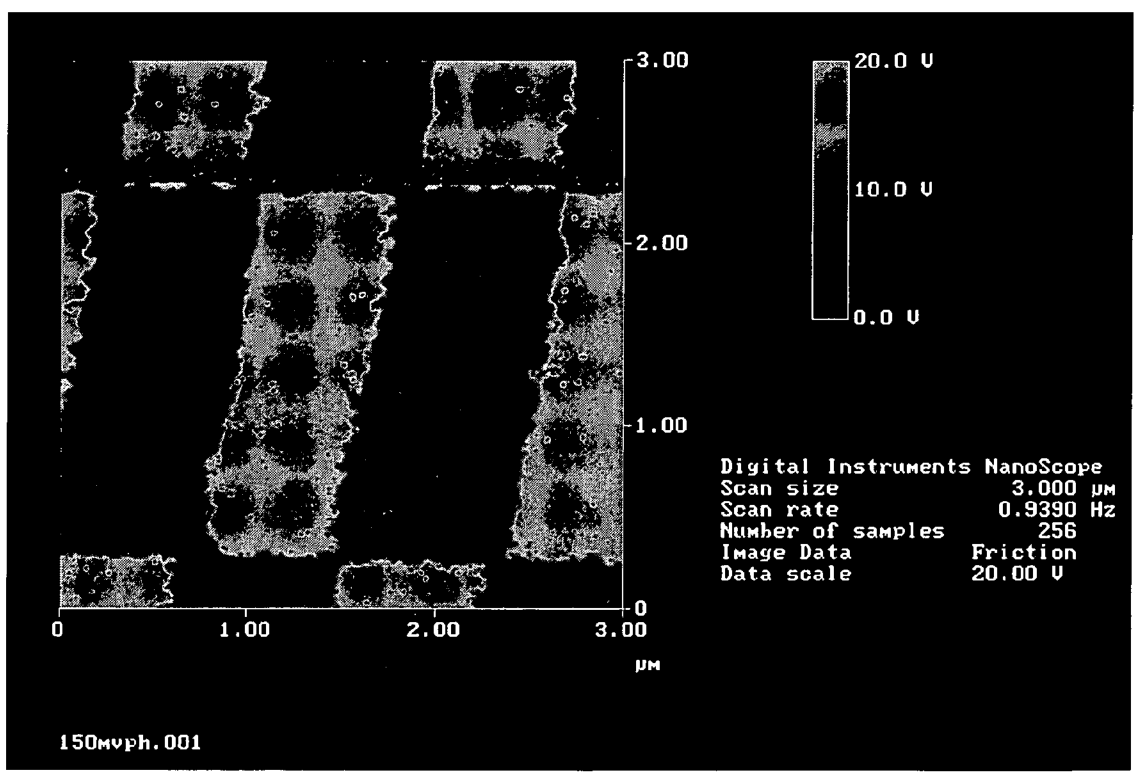

FIG. 26 is a PFM measurement of a 30 nm thick PZT film showing a 180-degree phase shift between the applied voltage and the piezo-response signal for "up" and "down" polarized domains. This measurement was taken with an AC voltage of 150 mV, 60 kHz.

In magnetic hard drives the servo patterns for guiding the head over the media are like the actual data written magnetically. When reading back the data and servo patterns, both are left intact. In one form of ferroelectric memory, for example FERAM (ferroelectric RAM), the readback of data erases the data. When using ferroelectric media in combination with a movable head or head array and using a destructive readback method, a way must be found to make the servo patterns permanent.

One ferroelectric readback mechanism of probe storage features an erase/read, i.e., data that were read no longer exist unless written elsewhere. Servo control requires that tracks be referenced relative to permanent structures so that data may be located after being written. The erase/read readback mechanism makes writing permanent marks using the standard read/write physics difficult.

Capacitive sensors between the head and media wafer can provide accurate feedback, but they suffer from DC drift and hence are not reliable as a sole source of position sensing. Furthermore, they do not capture the relative motion between heads in the probe array that may occur due to stick-slip friction or non-uniform thermal expansion.

Marks placed on the media surface, via other means such as lithography, can provide the permanent servo information needed. However, these methods cannot produce features as finely as the read/write mechanism, and therefore standard servo patterns from magnetic recording cannot be used. Also, lithographic based servo marks will limit the extendibility of the recording density.

This invention addresses this problem by using lithographed embedded servo marks to encode DC positioning information. As the head sweeps, the transition times onto and off of the lithographed pattern are noted, and the ratio of the time spent on each leg of the pattern can give the relative position within a region. The ratio approach allows the measurement to be independent of actuation speed, as long as it remains constant over the sweep region. The pattern is formed by stitching triangles together. More than one triangle is used because the resolution of the pattern is limited by the triangles' aspect ratio, i.e., wider, shorter triangles provide better positioning information. The triangles should be made as wide as possible, while not violating lithographic limits or moving outside of the drift range of the sensor. The sensor limitation is imposed because the pattern repeats for a given head, and so the sensor must know what general area it is in to interpret the calibration information.

This lithographed servo pattern may be used to provide servo positioning feedback in conjunction with capacitive head/media sensors. The pattern is constructed to maximize the amount of DC positioning information available while being immune to changes in the readback velocity. It uses relatively large features that can easily be made via lithography.

Figure 27:
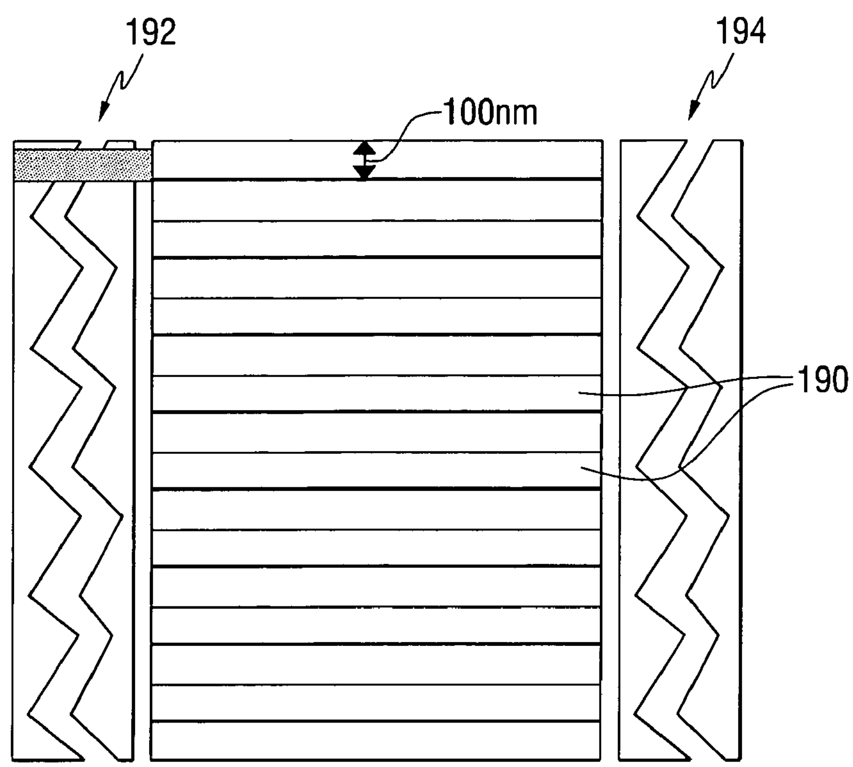
FIG. 27 is a schematic representation of tracks in a storage medium.

FIG. 27 shows the pattern to be used for a single read/write head and the multiple tracks 190 that the head must locate. The pattern 192 is placed at the beginning of a data track to calibrate the capacitive sensor prior to reading or writing data. The pattern 194 additionally may be placed at the end (as shown in FIG. 27) to measure the DC tracking accuracy.

Figure 28:
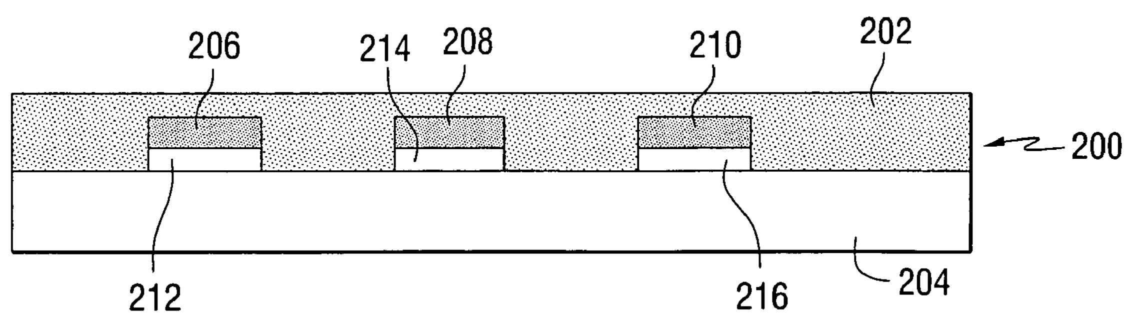
FIGS. 28, 29, 30 and 31 are side views of ferroelectric storage media.
Figure 29:
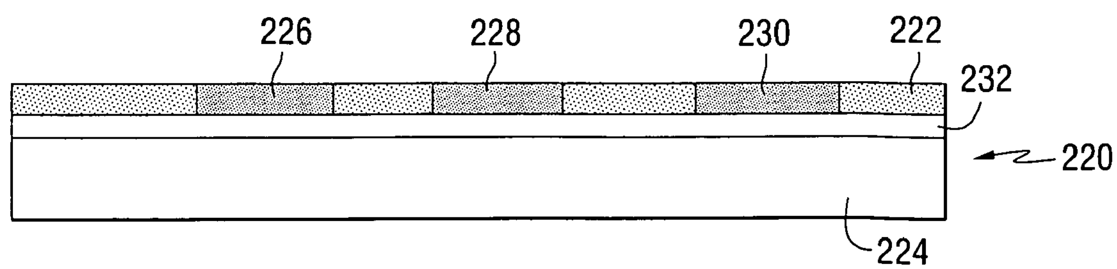

FIGS. 28, 29, 30 and 31 show various examples of servo patterns in a ferroelectric storage medium. In FIGS. 28 and 29, conductors have been inserted into the ferroelectric layer to form the servo pattern. Referring to FIG. 28, the ferroelectric storage medium 200 includes a layer of ferroelectric material 202 and a conductive substrate 204. Conductors 206, 208 and 210 are embedded in the ferroelectric layer and electrically isolated from the conductive substrate by insulators 212, 214 and 216 respectively. In FIG. 29, the ferroelectric storage medium 220 includes a layer of ferroelectric material 222 and a conductive substrate 224. Conductors 226, 228 and 230 are embedded in the ferroelectric layer and electrically isolated from the conductive substrate by an insulating layer 232.

Figure 30:
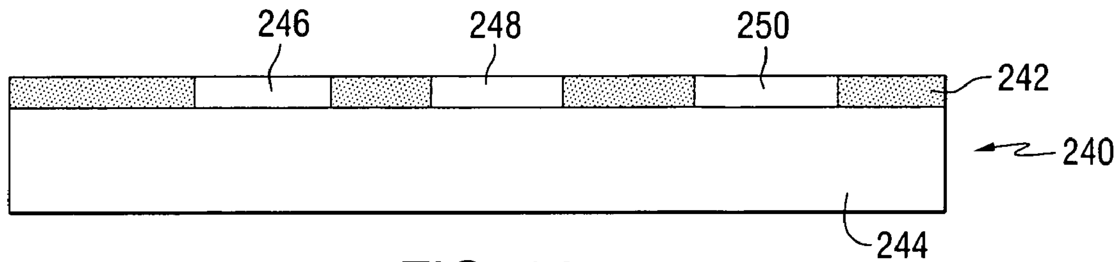

In FIG. 30, the ferroelectric storage medium 240 includes a layer of ferroelectric material 242 and a conductive substrate 244. Gaps 246, 248 and 250 are positioned in the ferroelectric layer to form a disruptive servo pattern. Some type of disruptive technique such as ion implantation, x-rays, UV bombardment, laser etching, doping with other material can be used to disrupt the ferroelectric material, thereby changing the dielectric constant, polarization or conductivity so that the head can detect the change.

Figure 31:
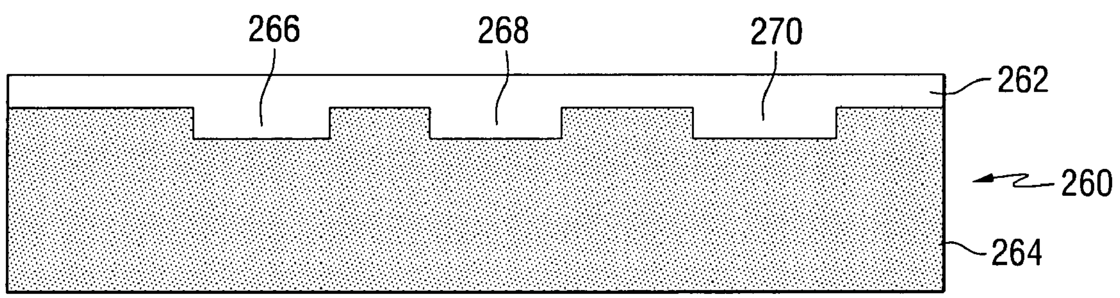

In FIG. 31, the ferroelectric storage medium 260 includes a layer of ferroelectric material 262 and a conductive substrate 264. Depressions 266, 268 and 270 are etched or otherwise formed in the conductive substrate to form a disruptive servo pattern. Some type of etching means, plasma etch, wet etch, ion beam, laser etching, chemical ion beam can be used to build topology into the substrate. The ferroelectric film is then planarized with chemical mechanical polishing to flatten the film. The head would detect the marks because as the thickness of the film changes, the dielectric constant and capacitance will also change. This technique allows the use of low cost, low resolution lithography to form the servo marks.

Figure 32:
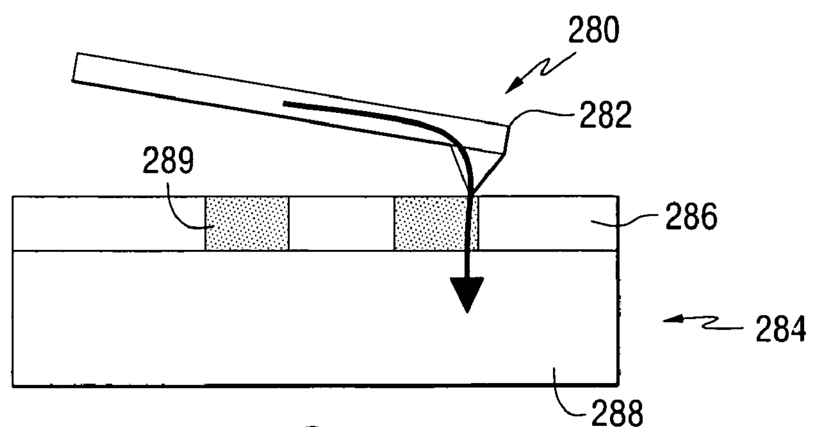
FIGS. 32, 33, 34, 35 and 36 are schematic illustrations of a probe lever and a storage medium.

Several additional methods can be used to form the servo marks. One example uses high fields and/or currents from the write head to chemically modify the ferroelectric material locally. FIG. 32 is a schematic representation of an apparatus 280 that can be used to perform this method. A probe 282 is positioned adjacent to the surface of a ferroelectric storage medium 284. The ferroelectric storage medium 284 includes a layer of ferroelectric material 286 and a conducting bottom electrode 288. A voltage can be impressed between the probe and the bottom electrode, thereby subjecting the ferroelectric material layer to an electric field (and current). If the field is great enough across the ferroelectric material, it will break down, causing chemical modification 289 of the material due to plasma formation along the field trajectories. This process will change the chemical and physical properties of the material permanently, leading to conducting channels in these regions. A resistance or charge detecting head could then pick up the change.

In the case where an electric field is used to permanently polarize the ferroelectric media, a master template that has the triangular pattern etched into the surface could be used. The template can be lithography based, but does not require accurate line widths, only edges, so the lines can be wide, and timing can be derived from the edge. In this way, the entire piece of media can be "burned" at once, like a CD master.

Figure 33:
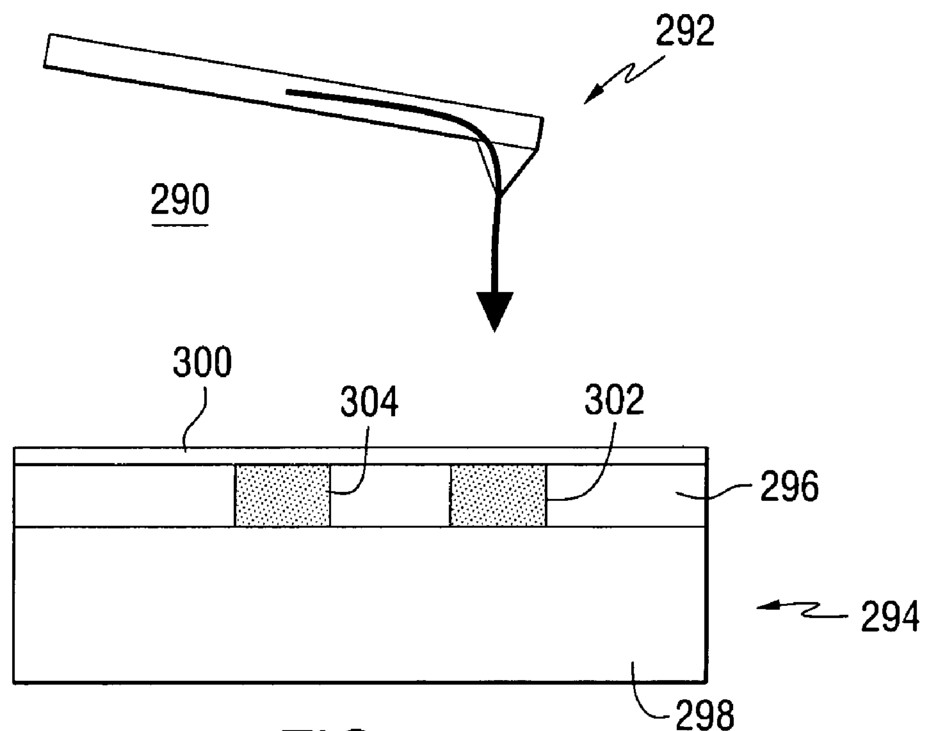

Another example uses field enhanced atom diffusion of an overcoat material. FIG. 33 is a schematic representation of an apparatus 290 that can be used to perform this method. A probe 292 is positioned near the surface of a ferroelectric storage medium 294. The ferroelectric storage medium 294 includes a layer of ferroelectric material 296 and a conducting bottom electrode 298. A voltage can be impressed between the probe and the bottom electrode, thereby subjecting the ferroelectric material layer to an electric field. In this example, the media is coated with a material 300 such as boron, sodium, potassium, silver, copper or other metallic compounds that migrate easily through materials when applying a high electric field across the material. When voltage is applied to the head, the field across the media causes the metal atoms to migrate in the ferroelectric media forming permanent conducting channels 302 and 304. The residue coating is removed afterwards, for example by mechanical polishing or chemically etching, leaving the implanted conducting channels in place. A resistance detecting head could then pick up the resistance change.

Figure 34:
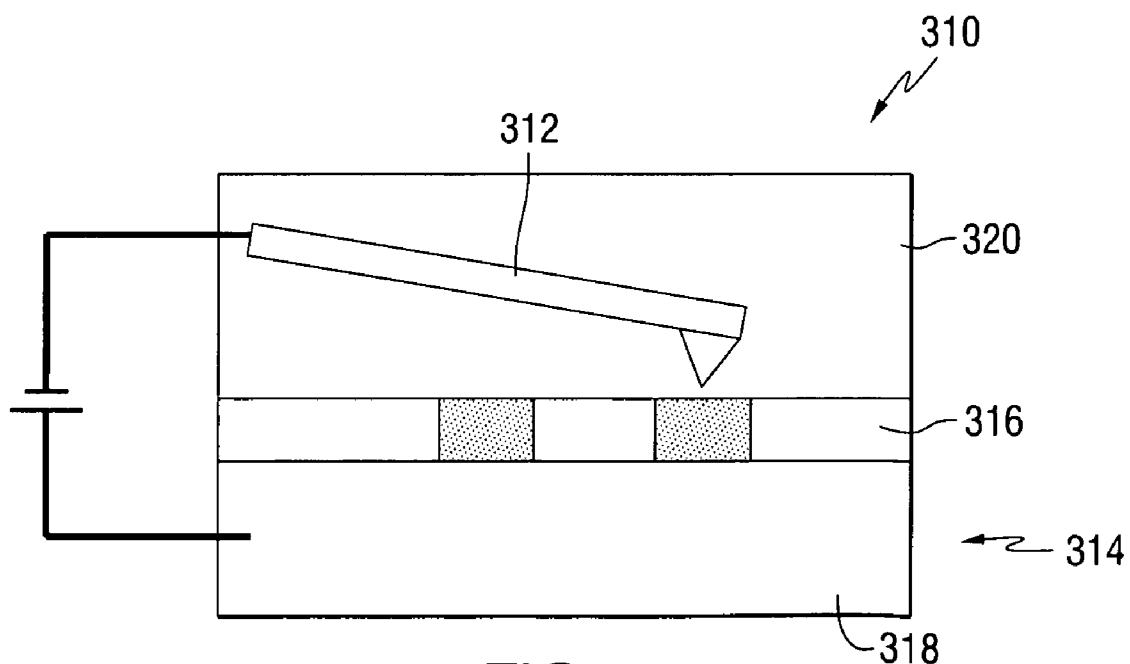

Still, another example uses field induced dissociation of a precursor gas and subsequent ion formation and migration. FIG. 34 is a schematic representation of an apparatus 310 that can be used to perform this method. A probe 312 is position adjacent to the surface of a ferroelectric storage medium 314. The ferroelectric storage medium 314 includes a layer of ferroelectric material 316 and a conducting bottom electrode 318. A voltage can be impressed between the probe and the bottom electrode, thereby subjecting the ferroelectric material layer to an electric field. The media is placed in a gas, vapor or liquid containing precursor molecules 320 of metal atoms. When voltage is applied to the head, the electric field at the media surface causes field induced dissociation of the precursor molecules and, depending on the amplitude of the applied field, also ionization of the compound atoms. Depending on their polarity these ions will easily migrate through the ferroelectric layer following the electric field trajectories. Once in contact with the bottom electrode these ions are neutralized, and permanent conducting channels are formed through the ferroelectric thin film. The precursor medium (gas, vapor liquid) is removed after the permanent servo pattern creation and the readback of the servo marks occurs analogous to the previous examples.

While the examples illustrated in FIGS. 31 and 33 describe the formation of permanent servo pattern embedded into ferroelectric media without changing the topography of the media surface, an additional method describes a technique combing local electronic and topography change.

Figure 35:
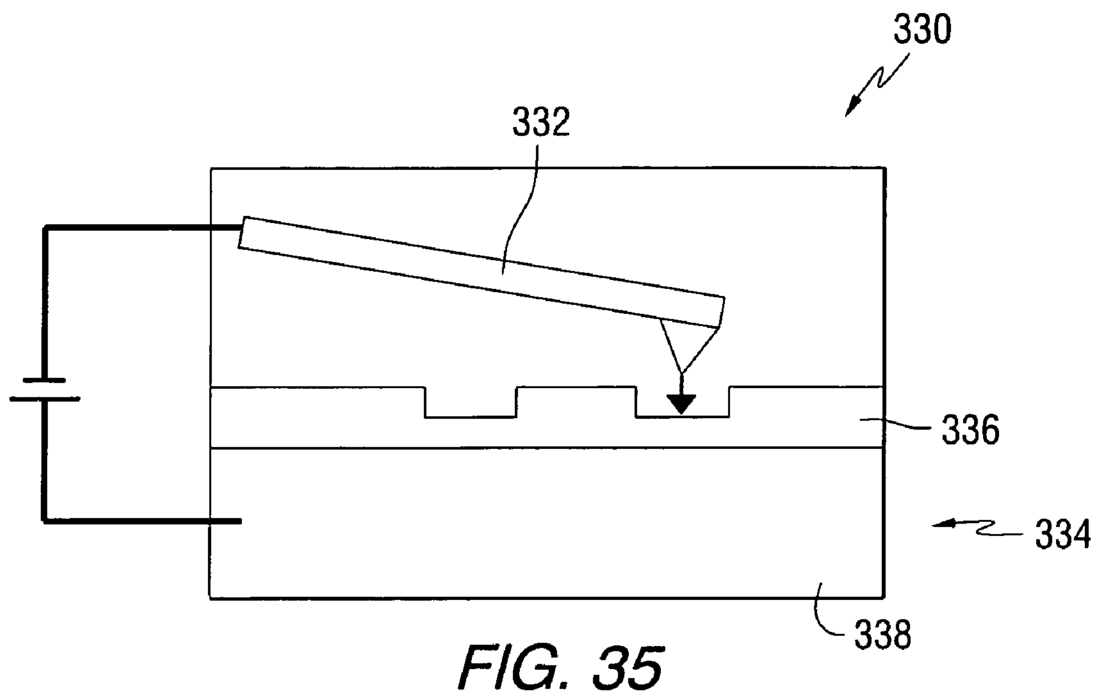

The additional method uses field enhanced etching or deposition. FIG. 35 is a schematic representation of an apparatus 330 that can be used to perform this method. A probe 332 is positioned adjacent to the surface of a ferroelectric storage medium 334. The ferroelectric storage medium 334 includes a layer of ferroelectric material 336 and a conducting bottom electrode 338. A voltage can be impressed between the probe and the bottom electrode, thereby subjecting the ferroelectric material layer to an electric field (and current). This is similar to the example of FIG. 34, but causes etching of the ferroelectric thin film or deposition of material onto the media, using materials recruited from the gas, vapor or liquid, or its dissociation products. In this case the servo pattern could be read by mechanically sensing the height change, or electronically, or by a combination of both.

Figure 36:
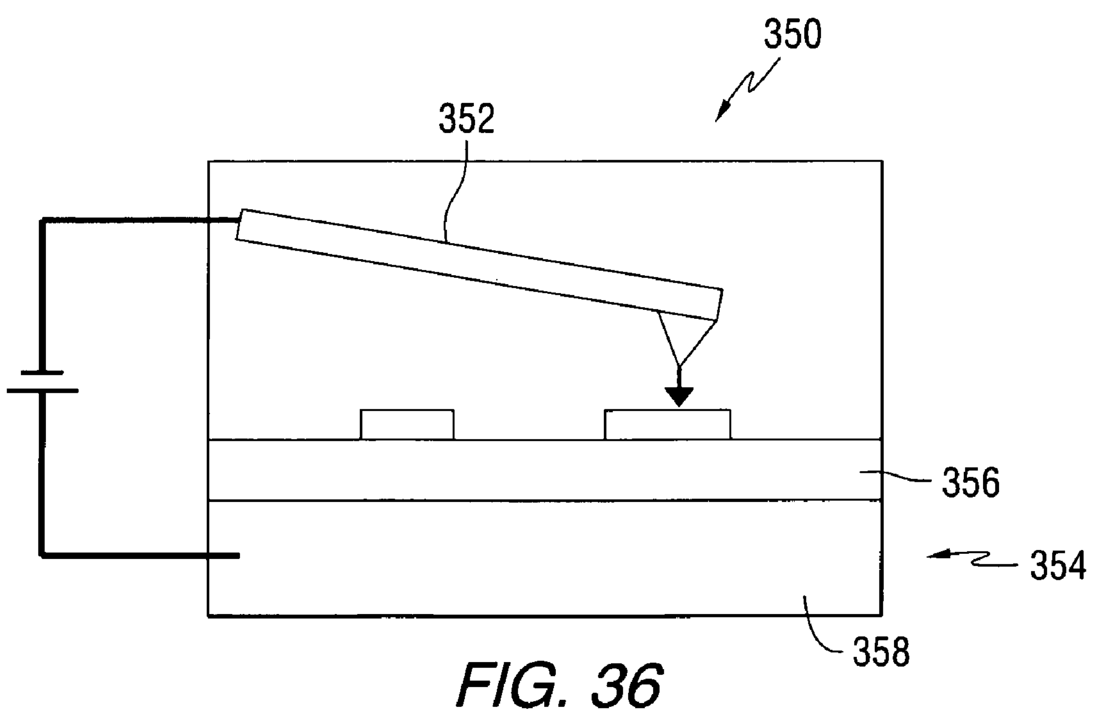

FIG. 36 is a schematic representation of an apparatus 350 that can be used to perform this method. A probe 352 is positioned adjacent to the surface of a ferroelectric storage medium 354. The ferroelectric storage medium 354 includes a layer of ferroelectric material 356 and a conducting bottom electrode 358. A voltage can be impressed between the probe and the bottom electrode, thereby subjecting the ferroelectric material layer to an electric field (and current).

Figure 37:
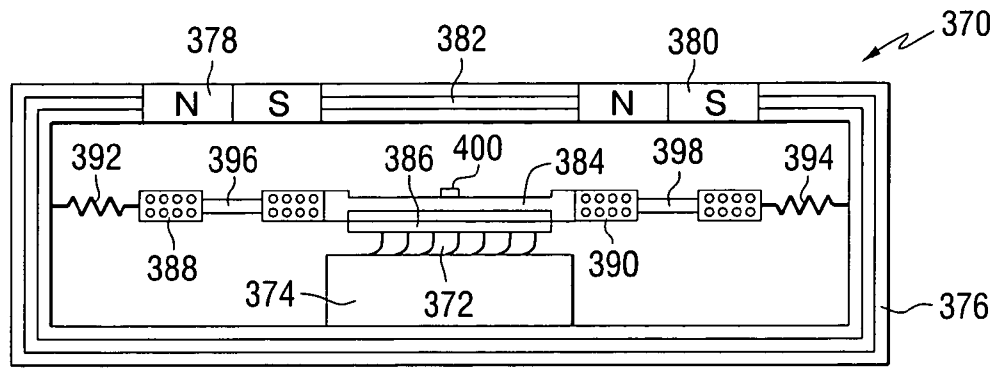
FIGS. 37, 38, 39 and 40 are schematic illustrations of positioning systems.

Devices constructed in accordance with this invention can further include means for providing relative movement between the storage medium and an array of probes. FIG. 37 is a schematic representation of a moving coil apparatus 370 that includes such means. An array 372 of probes that extend from a substrate 374 is placed in an enclosure 376 that can be formed of, for example, injection molded plastic. Magnets 378 and 380 are mounted in the case to provide a return path for magnetic flux. A layer of keeper material 382 is embedded in the case. A positioned structure 384 is used to position a ferroelectric storage medium 386. Voice coils 388 and 390 are coupled to opposite sides of the positioning structure, and attached to the case by springs 392 and 394. The springs can act as heat dissipation elements in combination with the keeper material. The springs can also act as a keeper to provide a return path for the magnetic flux to minimize interfering forces on the coils caused by stray flux. The voice coils can each include multiple turns of wire around a spacer 396 and 398, formed of, for example, a carbon resin or glass filled plastic. Current in the voice coil wires interacts with magnetic fields produced by the magnets to create forces that are used to move the positioning structure, and therefore move the ferroelectric medium. A stiffening structure 400 can be used to stiffen the torsional and bending frequency modes of the positioning structure to ensure sufficient frequency separation between components.

Figure 38:
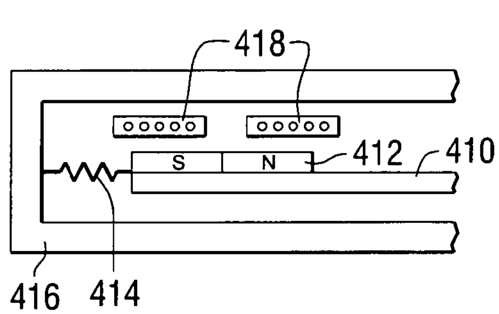

In an alternative apparatus, illustrated in FIG. 38, a moving magnet design is used. In this case the ferroelectric medium 410 is used to support a magnet 412. A spring 414 is used to couple the ferroelectric medium to the case 416. A voice coil 418 is mounted in the case and used to produce a magnetic field that interacts with the field of the magnet to create a force that is used to control the position of the ferroelectric medium.

Figure 39:
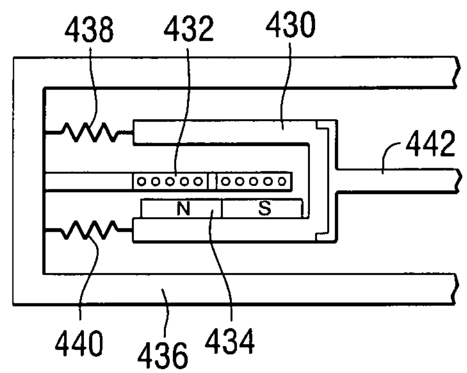

In an alternative apparatus, illustrated in FIG. 39, a moving magnet design is used. In this case a U-shaped keeper 430 is positioned around a voice coil 432 and used to support a magnet 434. The keeper is coupled to the case 436 by a pair of springs 438 and 440. The keeper is coupled to a positioning structure 442, that can be used to control the position of a ferroelectric storage medium. The dual spring approach minimizes out of plane unbalanced forces between the magnetic axis and the media case. A small air gap between the keeper and the magnet minimizes stray flux on the positioning structure and achieves maximum efficiency in actuation force.

Figure 40:
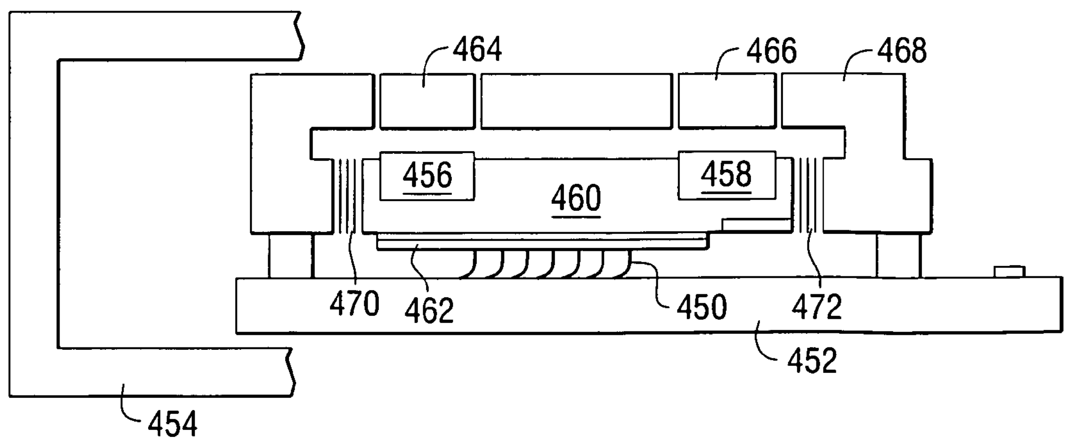

FIG. 40 shows another moving magnet design. An array 450 of probes that extend from a substrate 452 is placed in an enclosure 454 that can be formed of, for example, injection molded plastic. Magnets 456 and 458 are mounted in a positioning structure 460 that is used to position a ferroelectric storage medium 462. Voice coils 464 and 466 are mounted in a frame 468 which is attached to the positioning structure by springs 470 and 472. Magnetic fields produced by current in the voice coil wires interacts with magnetic fields produced by the magnets to create forces that are used to move the positioning structure, and therefore move the ferroelectric medium.

Destructive readout implies that after each read, the data must be written back to the media. During each read/write operation, errors may be introduced into the data, and thus the data reliability may deteriorate for each read/write circle. To address this deterioration, error correction can be applied to the data before it is rewritten following a destructive read operation. Without error correction, the data eventually will get corrupted after a certain number of read/write operations Buffering is an important consideration from a system perspective. The post-ECC user perceived bit error rate (BER) highly depends on the raw BER.

Figure 41:
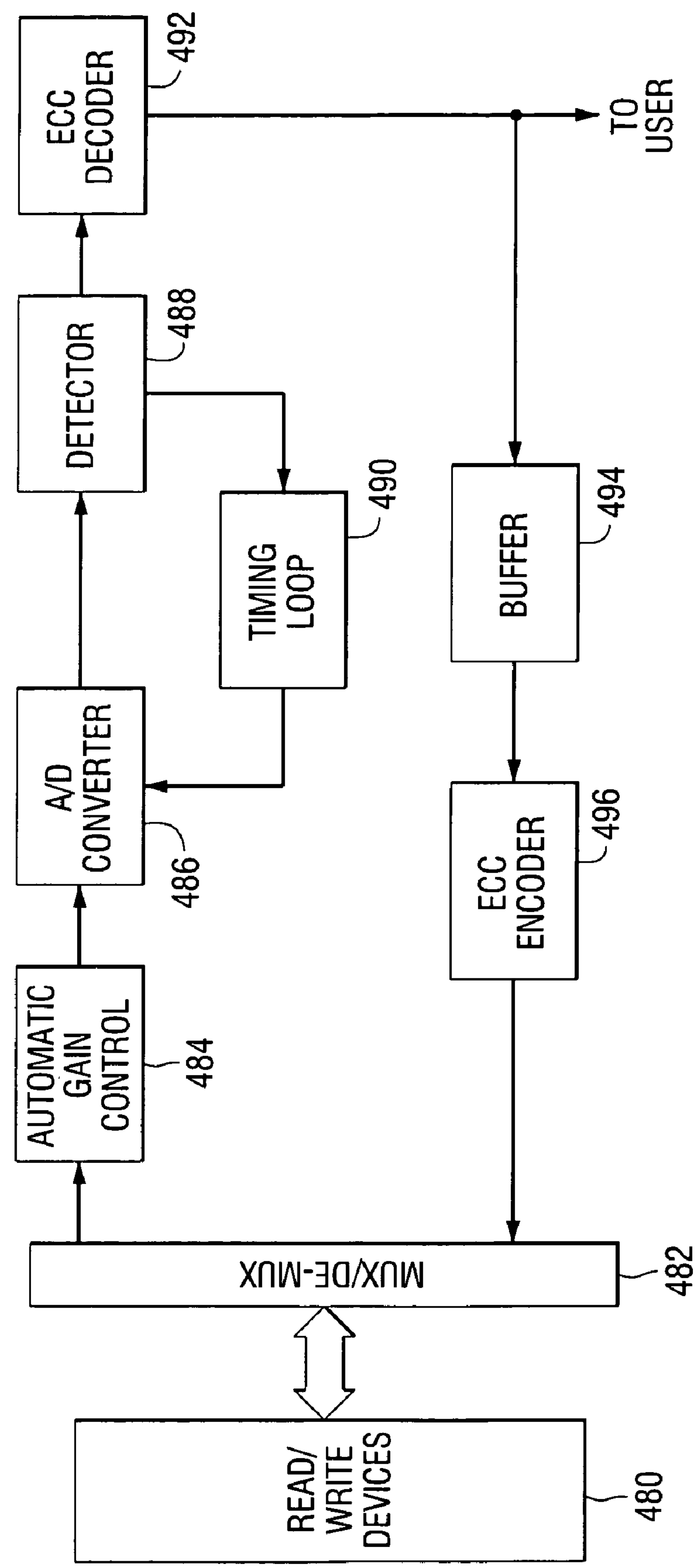
FIGS. 41 and 42 are block diagrams of the signal processing in a storage apparatus.

FIG. 41 is a block diagram of a system that includes a ferroelectric storage apparatus shown as read/write devices 480. Data that is read from these devices is demultiplexed as illustrated by block 482 and passed through an automatic gain control 484. The output of the automatic gain control is converted to a digital signal by an analog to digital converter 486 and detected by detector 488. A timing loop 490 gains access to the detected data from detector 488 and calculates the sampling phase, which is supplied to the analog to digital converter 486. In an alternate embodiment, the data sequence is supplied with known data. Both inductive and deductive timing recovery methods can be applied for timing recovery. In other words, the timing loop 490 can also operate without knowing the detected data sequence. The detected signals are decoded by an error correction code decoder 492 and sent to the user. Examples of error correction codes include but not limited to Reed-Solomon codes, Reed-Muller codes, or more generally BCH codes. The decoded signals are also sent to a buffer 494 and subject to error correction encoding as shown by block 496 prior to being rewritten to the storage medium. In an alternate embodiment, the error correction encoding can be intermittently skipped, depending on the raw bit error rate of the channel. In other words, the data can be written back to the media without going through the error correction decoding and encoding intermittently.

Figure 42:
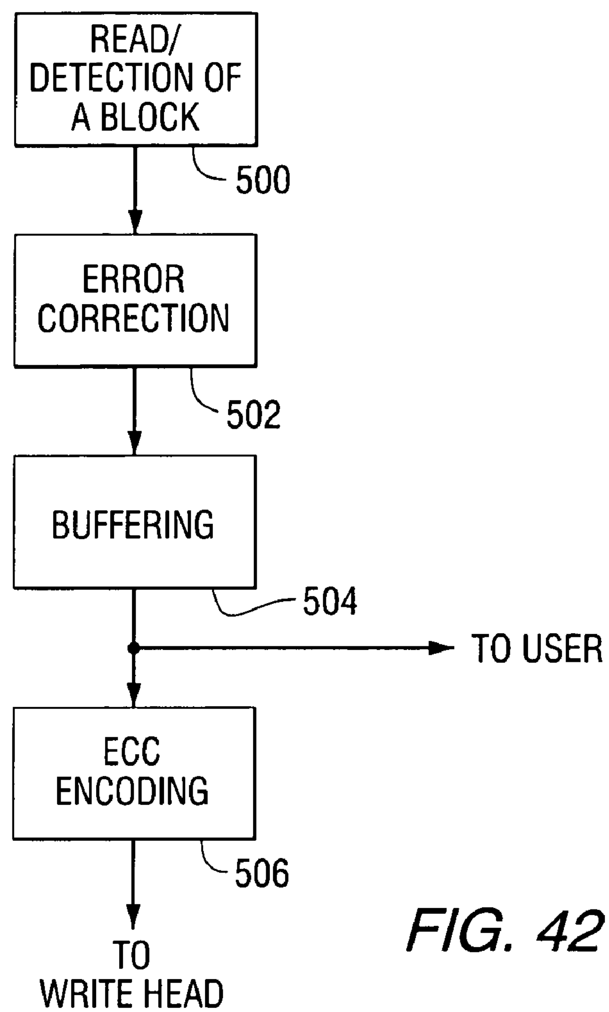

FIG. 42 is a more generic block diagram of the error correction aspects of this invention. A block of data is read 500, error correction codes are applied to recover the data 502, and then the recovered data is stored in a buffer 504 and delivered to the user. The recovered data is subject to error correction coding 506 prior to being rewritten to the ferroelectric storage medium.

The probes of this invention can include a plurality of read electrodes for detecting changes in polarity of ferroelectric domains in a plurality of tracks in a ferroelectric medium, and a plurality of write electrodes for applying an electric field to the ferroelectric domains in the ferroelectric medium, wherein each electrode of the plurality of write electrodes trails one of the electrodes in the plurality of read electrodes and is configured to apply the electric field to one of the ferroelectric domains following a read operation in which the polarity of the ferroelectric domain was changed.

Figure 43:
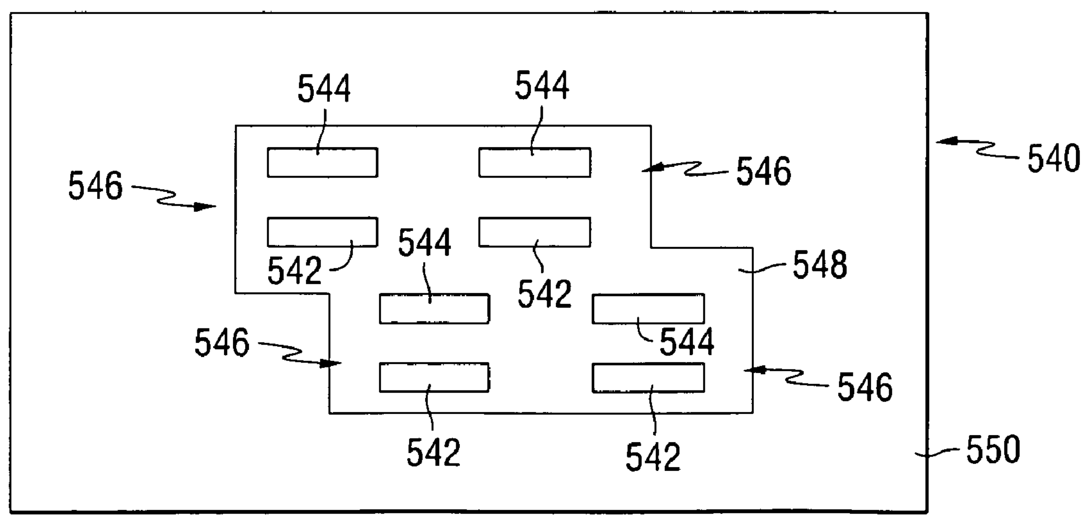
FIG. 43 is a plan view of a transducer constructed in accordance with the present invention.

FIG. 43 is a plan view of an air bearing surface of a transducer 540 for use with a ferroelectric storage medium in accordance with the present invention. Transducer 540 includes a plurality of read electrodes 542 and a plurality of write electrodes 544. Each of the write electrodes 544 is positioned adjacent to one of the read electrodes 542, thereby forming a plurality of pairs of electrodes 546. The read and write electrodes are mounted in a dielectric material 548 and surrounded by a shield 550.

When the transducer 540 moves with respect to a storage medium, the write electrodes 544 trail the read electrodes 542. As the read electrodes read data from the ferroelectric storage media, the data is destroyed. The problem of destroying data during readback is addressed by the present invention, which utilizes the write electrodes 544 to re-write the data following reading of the data by the read electrodes 542. The re-written data returns the domains on the ferroelectric storage medium to their condition prior to the read operation. The shield can be electrically grounded and used to reduce the noise sensed by the read electrode. The shield also prevents stray signals or fields from reaching the read electrode and prevents overwriting of adjacent tracks during the write process.

Figure 44:
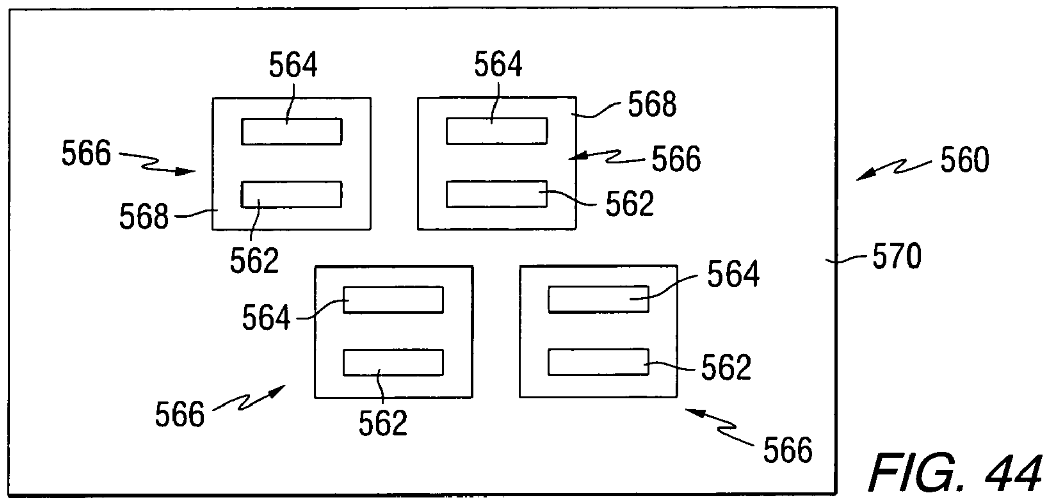
FIG. 44 is a plan view of another transducer constructed in accordance with the present invention.

FIG. 44 is a plan view of an air bearing surface of another transducer 560 for use with a ferroelectric storage medium in accordance with the present invention. Transducer 560 includes a plurality of read electrodes 562 and a plurality of write electrodes 564. Each of the write electrodes 564 is positioned adjacent to one of the read electrodes 562, thereby forming a plurality of pairs of electrodes 566. The read and write electrodes are mounted in a dielectric material 568 and surrounded by a shield 570.

When the transducer 560 moves with respect to a storage medium, the write electrodes 564 trail the read electrodes 562. When the read electrodes read data from the ferroelectric storage media, the data is destroyed. The problem of destroying data during readback is addressed in this example by utilizing the write electrodes 564 to re-write the data following reading of the data by the read electrodes 562.

Figure 45:
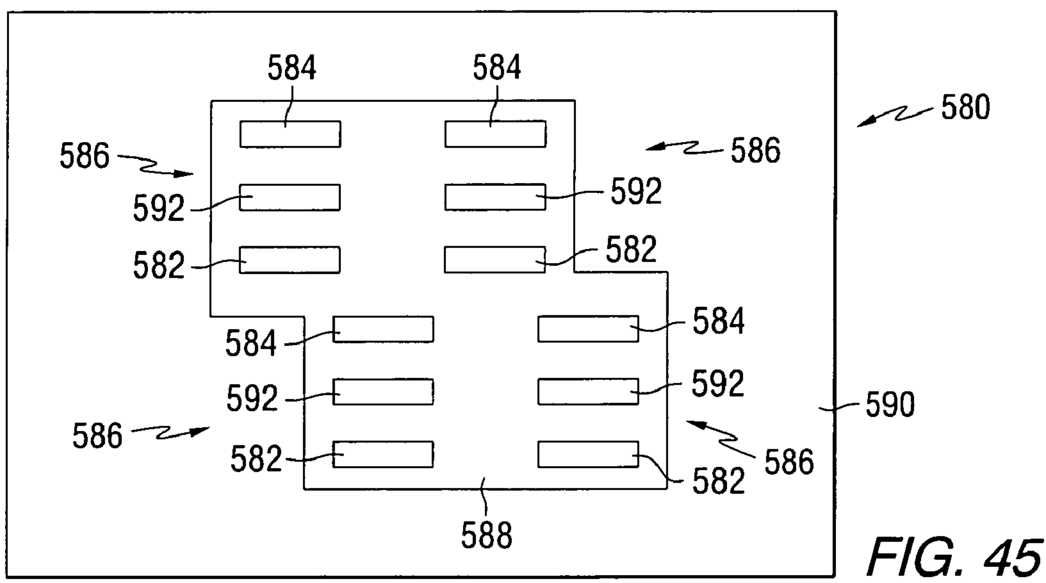
FIG. 45 is a plan view of another transducer constructed in accordance with the present invention.

FIG. 45 is a plan view of an air bearing surface of another transducer 580 for use with a ferroelectric storage medium in accordance with the present invention. Transducer 580 includes a plurality of read electrodes 582 and a plurality of write electrodes 584, thereby forming a plurality of pairs of electrodes 586. Each electrode in the plurality of write electrodes is positioned near one of the read electrodes 582. The read and write electrodes are mounted in a dielectric material 588 and surrounded by a shield 590. Additional shields 592 are positioned between the read and write electrodes in each pair of electrodes.

When the transducer 580 moves with respect to a storage medium, write electrodes 584 trail the read electrodes 582. The problem of destroying data during readback is addressed in this example by utilizing the write electrodes 584 to re-write the data following reading of the data by the read electrodes 582.

Figure 46:
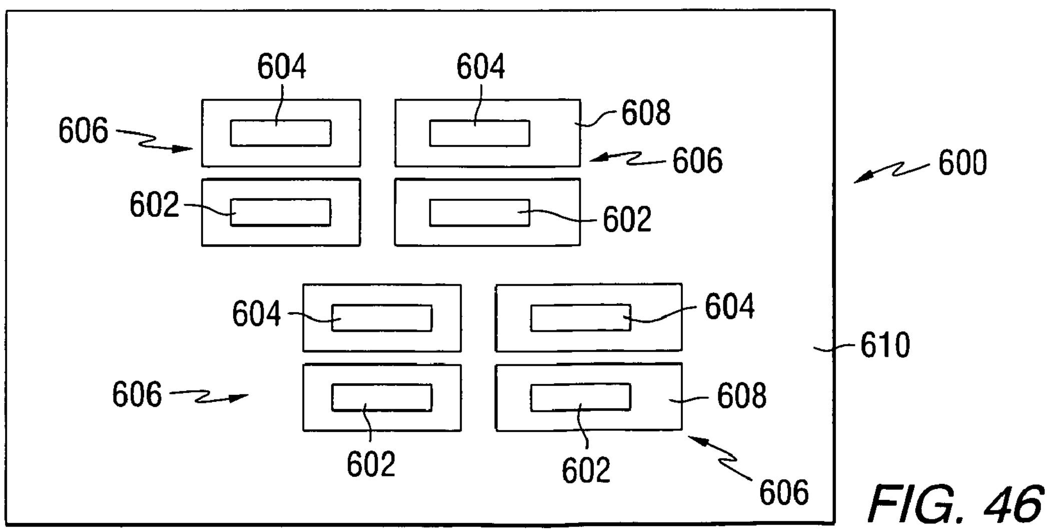
FIG. 46 is a plan view of another transducer constructed in accordance with the present invention.

FIG. 46 is a plan view of an air bearing surface of a transducer 600 for use with a ferroelectric storage medium in accordance with the present invention. Transducer 600 includes a plurality of read electrodes 602 and a plurality of write electrodes 604. Each of the write electrodes 604 is positioned near one of the read electrodes 102, thereby forming a plurality of pairs of electrodes 606. The read and write electrodes are mounted in a dielectric material 608 and surrounded by a shield 610.

When the transducer 600 moves with respect to a storage medium, the write electrodes 604 trail the read electrodes 602. When the read electrodes read data from the ferroelectric storage media, the data is destroyed. The problem of destroying data during readback is addressed in this example by utilizing the write electrodes 604 to re-write the data following reading of the data by the read electrodes 602.

The various electrodes and shields illustrated in FIGS. 43-46 can be fabricated of metal and are preferably of a material having a relatively high conductivity. Such metals include Cu, Ti, W and Ni. The electrodes can be mounted in a dielectric material, such as $Al_2O_3$, $SiO_2$, or SiN. The transducer can be fabricated in accordance with any appropriate technique. For example, fabrication techniques used in the manufacture of magnetic recording heads can be employed. The transducer can be employed with any type of ferroelectric storage medium. For example, the transducer is well suited for use in a disc storage device or a probe storage device.

While the invention has been described in terms of several examples, it will be apparent to those skilled in the art that various changes can be made to the disclosed examples without departing from the scope of the invention as set forth in the following claims.

What is claimed is:

1. An apparatus comprising:

a ferroelectric storage medium;

a transducer for reading data from the ferroelectric storage medium and for writing data to the ferroelectric storage medium, the transducer including a substrate and a probe coupled to the substrate, wherein the probe includes a conductive element and a bilayer structure, wherein the bilayer structure includes first and second layers having different biaxial stress levels, causing the probe to bend toward the ferroelectric storage medium.

2. The apparatus of claim 1, wherein the conductive element includes a rectangular end.

3. The apparatus of claim 1, wherein the conductive element comprises a conductive oxide.

4. The apparatus of claim 1, further comprising circuitry embedded in the substrate.

5. The apparatus of claim 1, further comprising an actuator for moving the ferroelectric storage medium in a first direction for reading and in a second direction for writing.

6. The apparatus of claim 5, wherein the actuator comprises:

a positioning member coupled to the ferroelectric storage medium;

a case containing the positioning member;

a magnet and a coil wherein at least one of the magnet and coil is connected to the positioning member and the other one of the magnet and coil is fixed with respect to the case; and springs for coupling the positioning member to the case.

7. The apparatus of claim 6, wherein the actuator further comprises:

a magnetic keeper embedding in the case.

8. The apparatus of claim 1, further comprising a circuit for applying a voltage to the conductive element, the circuit comprising:

a first amplifier having a differential input including first and second input terminals;

a conductor for connecting the first input terminal to the conductive element;

a feedback circuit branch for connecting an output of the amplifier to the first input terminal; and a connection for applying a control signal to the second input terminal.

9. The apparatus of claim 8, further comprising:

a second amplifier having a differential input including first and second input terminals, wherein the first input of the second amplifier is connected to the output of the first amplifier and the second input of the second amplifier is connected to the second input of the first amplifier.

10. The apparatus of claim 8, wherein the feedback circuit branch comprises a resistor.

11. The apparatus of claim 1, further comprising:

a first electrode attached to the probe; and a second electrode attached to the substrate, wherein forces between the first and second electrodes are used to move the probe.

12. The apparatus of claim 1, further comprising:

a first electrode attached to the probe; and a second electrode attached to the storage medium, wherein forces between the first and second electrodes are used to move the probe.

13. The apparatus of claim 1, wherein the conductive element and the ferroelectric storage medium are comprised of materials that form a Schottky barrier when the conductive element is in contact with the ferroelectric storage medium.

14. The apparatus of claim 1, further comprising:

a piezoelectric element coupled to the probe.

15. The apparatus of claim 1, further comprising:

a detector for detecting a laser beam reflected from the probe.

16. The apparatus of claim 1, further comprising:

permanent servo marks in the ferroelectric storage medium.

17. The apparatus of claim 16, wherein the permanent servo marks comprise:

conductive structures in a ferroelectric layer in the ferroelectric storage medium.

18. The apparatus of claim 17, wherein the ferroelectric storage medium includes a conducting substrate, and the conductive structures are electrically insulated from the conducting substrate.

19. The apparatus of claim 16, wherein the permanent servo marks comprise:

disruptions in a ferroelectric layer in the ferroelectric storage medium.

20. The apparatus of claim 16, wherein the ferroelectric storage medium includes a conducting substrate, and the permanent servo marks comprise depressions in the conducting substrate.

21. The apparatus of claim 1, further comprising:

a circuit for reading and writing to the ferroelectric storage medium, the circuit including a buffer to storing data read from the ferroelectric storage medium and an encoder for error correcting the data before writing the data to the ferroelectric storage medium.

22. The apparatus of claim 1, wherein the transducer is fabricated at temperatures that are compatible with silicon device manufacture.

23. The apparatus of claim 1, wherein the probe includes:

a plurality of read electrodes for detecting changes in polarity of ferroelectric domains in a plurality of tracks in a ferroelectric medium; and a plurality of write electrodes for applying an electric field to the ferroelectric domains in the ferroelectric medium;

wherein each electrode of the plurality of write electrodes trails one of the electrodes in the plurality of read electrodes and is configured to apply the electric field to one of the ferroelectric domains following a read operation in which the polarity of the ferroelectric domain was changed.

24. The apparatus of claim 23, further including a first shield which extends around the read electrodes and the write electrodes.

25. The apparatus of claim 24, further including a second Shield positioned between the read electrodes and the write electrodes.

26. The apparatus of claim 23, further including a first shield which extends around pairs of the read electrodes and the write electrodes.

27. The apparatus of claim 26, further including a second shield that extends between the read electrode and the write electrode in each pair.

28. The apparatus of claim 23, wherein the read electrodes and write electrodes are positioned in a dielectric material.

29. The apparatus of claim 1, wherein the probe includes a plurality of read/write electrodes for detecting changes in polarity of ferroelectric domains in a ferroelectric medium, and for applying an electric field to the ferroelectric domains in the ferroelectric medium.

30. The apparatus of claim 29, further including a shield which extends around the read/write electrodes.

31. The apparatus of claim 29, wherein the read/write electrodes are positioned in a dielectric material.

* * * * *

UNITED STATES PATENT AND TRADEMARK OFFICE

CERTIFICATE OF CORRECTION

PATENT NO. : 7,447,140 B2
APPLICATION NO. : 10/902910
DATED : November 4, 2008
INVENTOR(S) : Mark Ian Lutwyche et al.

It is certified that error appears in the above-identified patent and that said Letters Patent is hereby corrected as shown below:

Detailed Description of the Drawings

Column 7, Line 2
At bandwidths of 10 MHz, and SNR of 10 dB is possible at data densities of [[1 Thit/inch$^2$]] 1 Tbit/inch$^2$.

Signed and Sealed this

Thirtieth Day of June, 2009

JOHN DOLL
*Acting Director of the United States Patent and Trademark Office*